United States Patent
Alavi et al.

(10) Patent No.: US 12,375,115 B2
(45) Date of Patent: Jul. 29, 2025

(54) DETERMINING LO LEAKAGE AND QUADRATURE ERROR PARAMETERS OF AN RF FRONT END

(71) Applicant: Analog Devices, Inc., Wilmington, MA (US)

(72) Inventors: Reza Alavi, Belle Mead, NJ (US); Adam Ruan, Somerset, NJ (US); Yupeng Liu, Summitt, NJ (US)

(73) Assignee: Analog Devices, Inc., Wilmington, MA (US)

( * ) Notice: Subject to any disclaimer, the term of this patent is extended or adjusted under 35 U.S.C. 154(b) by 249 days.

(21) Appl. No.: 18/158,328

(22) Filed: Jan. 23, 2023

(65) Prior Publication Data

US 2023/0163798 A1 May 25, 2023

Related U.S. Application Data

(63) Continuation of application No. PCT/US2021/042265, filed on Jul. 20, 2021.
(Continued)

(51) Int. Cl.
*H04B 1/16* (2006.01)
*H04B 1/71* (2011.01)
*H04B 17/354* (2015.01)

(52) U.S. Cl.
CPC ......... *H04B 1/1676* (2013.01); *H04B 1/7101* (2013.01); *H04B 17/354* (2015.01)

(58) Field of Classification Search
CPC ......... H04L 27/3863; H04L 2027/0016; H04L 27/364; H04L 27/0014; H04L 2027/0024;
(Continued)

(56) References Cited

U.S. PATENT DOCUMENTS

| 2008/0113628 A1* | 5/2008 | Muhammad ............. H04B 1/52 455/77 |
|---|---|---|
| 2010/0061496 A1 | 3/2010 | Black et al. |

(Continued)

FOREIGN PATENT DOCUMENTS

| CN | 115989647 A | 4/2023 |
|---|---|---|
| EP | 2040333 A1 | 3/2009 |

(Continued)

OTHER PUBLICATIONS

"International Application Serial No. PCT/US2021/042265, International Preliminary Report on Patentability mailed Feb. 2, 2023", 8 pgs.
(Continued)

*Primary Examiner* — Golam Sorowar
(74) *Attorney, Agent, or Firm* — Schwegman Lundberg & Woessner, P.A.

(57) ABSTRACT

The present disclosure provides a method and a system to estimate LO leakage and quadrature error parameters for a transmitter RF front end, such as a direct up-conversion transmitter RF front end, in a joint fashion. The proposed method utilizes a PN sequence inserted at the transmitter baseband. At the observation receiver side, an RX accumulator is implemented to sum receiver signals to take advantage of a despreading gain using the same PN sequence from transmitter side. Through the despreading process, the receiver-transmitter channel may be estimated and used to extract the quadrature error parameters. The estimated channel may also be used to eliminate user data interference presented within the RX accumulator output, which may further be used to compute the LO leakage.

18 Claims, 16 Drawing Sheets

Related U.S. Application Data

(60) Provisional application No. 63/054,953, filed on Jul. 22, 2020.

(58) Field of Classification Search
CPC ............... H04L 27/368; H04L 27/2647; H04L 2027/0018; H04L 25/02; H04L 25/03891; H04L 27/2644; H04L 27/2652; H04L 27/26526; H04L 27/26538; H04L 27/26546; H04L 27/2663; H04B 1/30; H04B 1/525; H04B 1/707; H04B 1/0475; H04B 2001/0425; H04B 1/123; H04B 17/21; H04B 7/0413; H04B 17/0085; H04B 17/11; H04B 17/14; H04B 7/0452; H04B 1/40; H04B 17/20; H04B 17/364; H04B 7/005; H04B 1/0458; H04B 1/0483; H04B 1/7093
See application file for complete search history.

(56) References Cited

U.S. PATENT DOCUMENTS

| | | |
|---|---|---|
| 2010/0158076 A1 | 6/2010 | Snlyely et al. |
| 2011/0292978 A1 | 12/2011 | Kravitz |
| 2012/0001810 A1* | 1/2012 | Soualle ................. G01S 19/02 343/703 |
| 2014/0269863 A1 | 9/2014 | Fan et al. |
| 2019/0036749 A1* | 1/2019 | Erez .................... H04L 27/2646 |
| 2019/0097866 A1* | 3/2019 | Sestok, IV .......... H04L 27/3863 |
| 2022/0200838 A1* | 6/2022 | Azadet .................. H03D 3/009 |

FOREIGN PATENT DOCUMENTS

| | | |
|---|---|---|
| EP | 3584963 A1 | 12/2019 |
| WO | WO-2022020278 A1 | 1/2022 |

OTHER PUBLICATIONS

"International Application Serial No. PCT/US2021/042265, International Search Report mailed Oct. 13, 2021", 2 pgs.

"International Application Serial No. PCT/US2021/042265, Written Opinion mailed Oct. 13, 2021", 6 pgs.

"European Application Serial No. 21847123.3, Extended European Search Report mailed Jul. 9, 2024", 10 pgs.

"European Application Serial No. 21847123.3, Response filed Jan. 17, 2025 to Extended European Search Report mailed Jul. 9, 2024", 18 pgs.

\* cited by examiner

DETERMINING LO LEAKAGE AND QUADRATURE ERROR PARAMETERS OF AN RF FRONT END

RELATED APPLICATION

This application is a continuation filed under 35 USC 111(a) and claims benefit of priority of (1) Reza et al., International Application Number PCT/US2021/042265, published as WO 2022/020278, titled "SPREAD SPECTRUM BASED JOINT PARAMETER ESTIMATION OF QUADRATURE ERROR AND LO LEAKAGE," filed on Jul. 20, 2021; and (2) Reza et al., U.S. Provisional Patent Application No. 63/054,953, titled "SPREAD SPECTRUM BASED JOINT PARAMETER ESTIMATION OF QUADRATURE ERROR AND LO LEAKAGE," filed Jul. 22, 2020, the entirety of each of which is incorporated by reference herein.

TECHNICAL FIELD OF THE DISCLOSURE

The present disclosure relates generally to estimation of local oscillator (LO) leakage and quadrature error parameters of a transceiver radio frequency (RF) front end. In particular, the present disclosure relates to estimation of LO leakage and quadrature error parameters in direct conversion RF front end architectures.

BACKGROUND

Transmitters for wireless infrastructure (e.g., cellular base stations) have traditionally been implemented using super-heterodyne or complex intermediate frequency (IF) architectures. Implementing a wireless transmitter using a direct conversion architecture instead of a super-heterodyne architecture can reduce overall system cost and size through integration and the use of fewer components.

Direct conversion transmitters typically include an in-phase (I) and quadrature phase (Q) baseband paths, each including a respective mixer that performs frequency conversion using a LO signal having a frequency about equal to the desired RF center frequency. The I path mixer LO signal and Q path mixer LO signal are 90 degrees out of phase (sine and cosine), and the mixer outputs are summed at RF.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for all of the desirable attributes disclosed herein. Details of one or more implementations of the subject matter described herein are set forth below and the accompanying drawings.

Integrating a transceiver RF front end into a radio frequency integrated circuit (RFIC) is popular nowadays. One of the preferred RF front end architectures is based on direct conversion, also known as zero-intermediate frequency (zero-IF). A direct conversion transceiver based on a direct conversion front end architecture may suffer from LO leakage. If not corrected, transmit LO leakage can produce unwanted emissions within the desired transmission, potentially compromising system performance. Furthermore, a direct conversion front end architecture may suffer from quadrature errors, the latter also known as I/Q imbalances.

Figure 1:
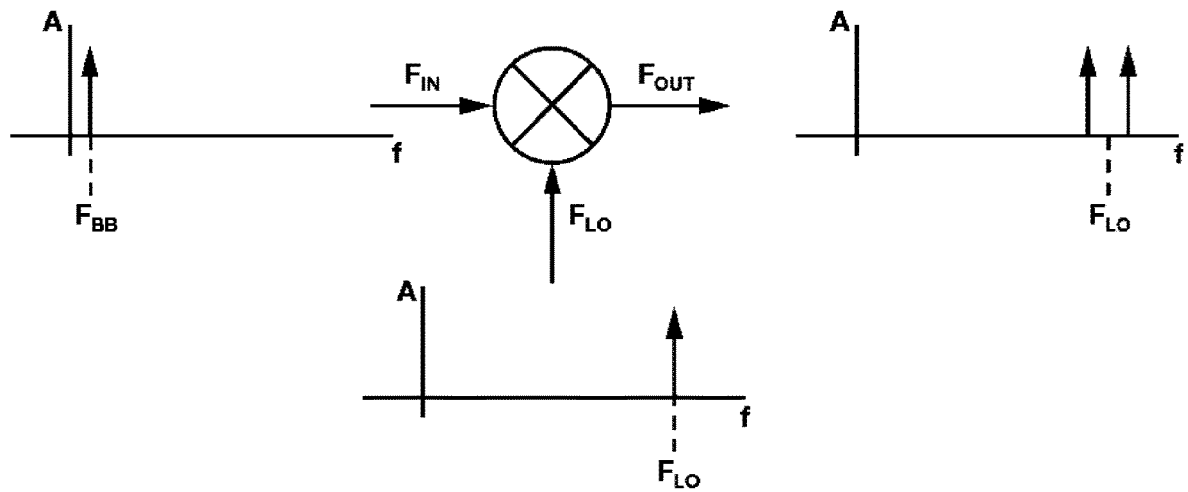
FIG. 1 illustrates an ideal RF mixer.
Figure 2:
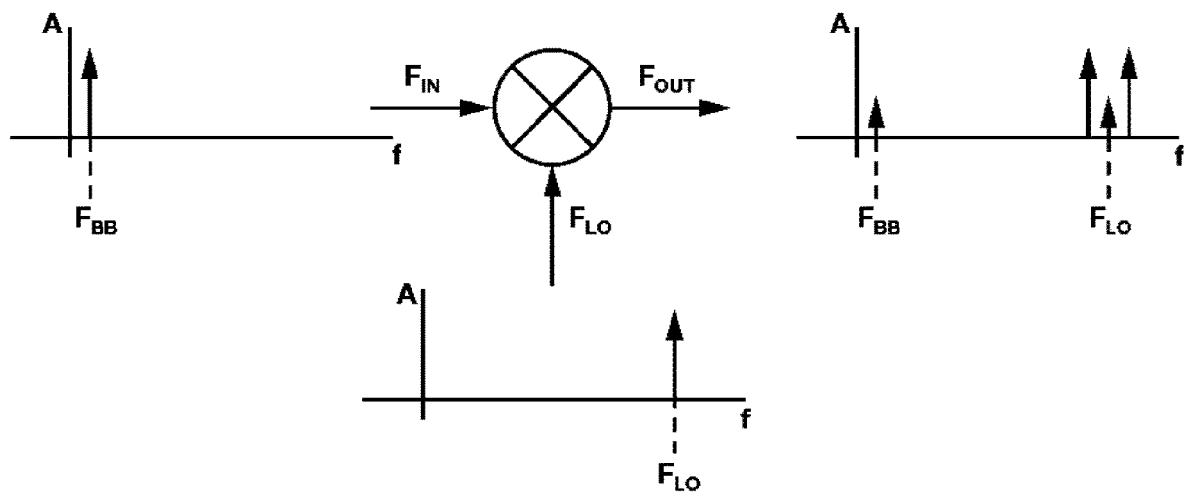
FIG. 2 illustrates the concept of LO leakage.

To understand the problem of LO leakage, reference is made to FIGS. 1 and 2. In the example of FIG. 1, an RF mixer is shown that includes two input ports and one output port. Left to the RF mixer a first input signal is shown, below the RF mixer a second input signal is shown and right to the RF mixer an output signal is shown, each having a certain frequency (f) and an amplitude (A). An ideal mixer produces an output frequency $F_{OUT}$ that is the product of the two inputs $F_{IN}$ and $F_{LO}$, i.e., an input (IN) frequency and a frequency from a LO. In frequency terms, the output should be $F_{IN}+F_{LO}$ and/or $F_{IN}-F_{LO}$. If either input is undriven there can be no output. In the example of FIG. 1, $F_{IN}$ may be set to a baseband frequency ($F_{BB}$) with a baseband frequency of 1 MHz and $F_{LO}$ may be set to $F_{LO}$ with a LO frequency of 500 MHz. If the mixer were ideal it may produce an output that comprises two tones: one at 499 MHz and one at 501 MHz.

Because of parasitic capacitances within the silicon die and bond-wire to bond-wire coupling, the signal that is applied to the LO port of the RF mixer may also couple directly to the RF output. As shown in the example of FIG. 2, this may result in unwanted energy added at $F_{BB}$ and $F_{LO}$, indicated by the up arrows in $F_{OUT}$ at $F_{BB}$ and $F_{LO}$ in the top right graph. The energy at $F_{BB}$ may be ignored because it is far away from the desired output and may be filtered out by the RF components located after the mixer output. Regardless of the energy at $F_{BB}$, the energy at $F_{LO}$ can be a problem. It can be very close to or within the desired output signal and difficult or impossible to remove by filtering, since the filtering would also filter the desired signal. It is this unwanted energy at $F_{LO}$ that is referred to as LO leakage, i.e., the LO that drives the mixer has leaked to the mixer's output port.

In a real-IF architecture where only one sideband is to be transmitted, it may be possible to resolve LO leakage by using RF filtering. In contrast, in a zero-IF architecture where both sidebands are to be transmitted, the LO leakage is typically added at the center of the modulated spectrum of the desired output and presents a more difficult challenge. Conventional filtering is no longer an option, because any filtering that would remove the LO leakage would typically also remove portions of the wanted transmission.

Figure 3:
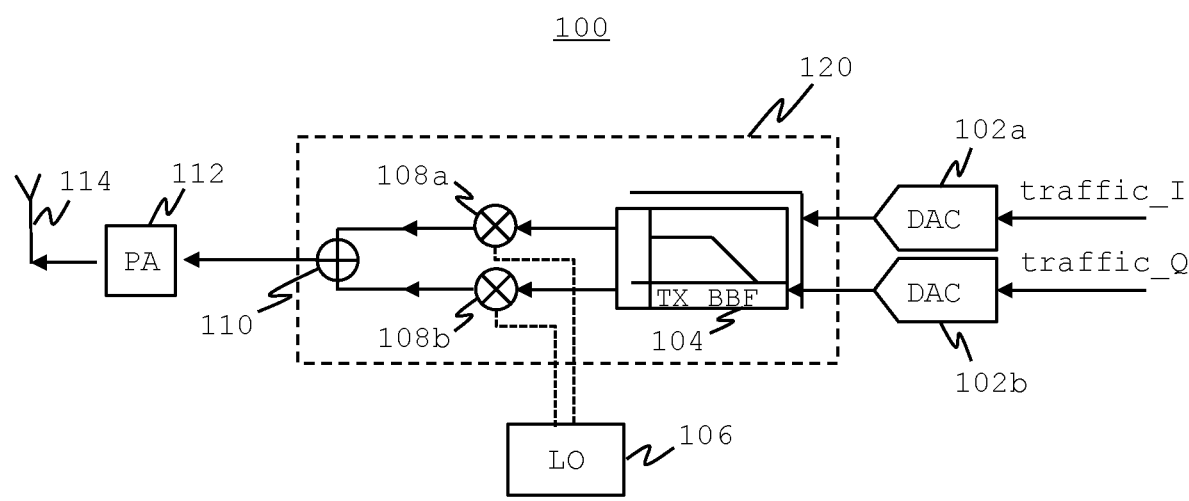
FIG. 3 is an illustrative block diagram of a part of a direct conversion transceiver RF front end.

To understand the problem of quadrature errors, reference is made to FIG. 3. FIG. 3 shows an example block diagram 100 of a part of a direct conversion wireless transmitter that uses an IQ modulator to modulate a bit stream onto a carrier. In the example of FIG. 3, two bit streams, denoted traffic_I and traffic_Q, may converted to analog signals by digital-to-analog converters (DAC) 102a, 102b. The DAC 102a, 102b outputs may drive two low-pass filters or TX baseband filters (BBF) 104 to, e.g., remove Nyquist images. The outputs of the filters 104 may then drive the baseband inputs of an IQ modulator, in FIG. 3 including two RF mixers 108a, 108b for each of the I and Q paths and a mixer 110. The RF mixers 108a, 108b may operate similar to the RF mixer shown in FIG. 2. An LO signal from the LO 106 may be split into two signals, equal in amplitude but with a phase difference of 90°. These two quadrature signals may drive the inputs of the two RF mixers 108a, 108b that, in this example, may be viewed as analog multipliers. The LO input to the RF mixer 108a, 108b may be driven by a relatively pure continuous waveform (CW) signal generated by a phase-locked loop (PLL). The outputs of the two RF mixers 108a, 108b may be added together in the mixer 110 to provide the IQ modulator's output. The signal may be transmitted via a TX RF front end, which typically includes a power amplifier 112 and an antenna 114.

Processing of the I and Q signals may result in I and Q signals that are unequal in amplitude or not separated by exactly 90°. For example, the gain of the I path may be greater than that of the Q path; this could be caused by a DAC 102a, 102b gain mismatch, low-pass filter insertion loss, mismatch, or gain imbalance inside the IQ modulator. A gain imbalance may result in the I multiplier at the RF mixer 108a to be larger than the Q multiplier at the RF mixer 108b, or vice versa. This typically results in a degraded signal integrity at the receiver because the receiver is expecting a perfectly balance between the I and Q signals. Moreover, in IQ modulators, the 90° phase split of the LO is typically achieved using either a polyphase filter or a divide-by-two flip-flop circuit. In either circuit, the 90° phase split or quadrature typically includes imperfections. The IQ gain imbalance and the phase imperfections, jointly referred to as quadrature errors, may result in incorrect reconstruction of the signal and bit decisions in the receiver.

It is noted that this disclosure is not limited to transceivers processing two bit streams, such as traffic_I and traffic_Q in the example of FIG. 3. For example, a single bit stream (e.g., traffic I or traffic_Q) may be split into two parallel bit streams in support of other modulation schemes, such as quadrature phase-shift keying (QPSK).

Figure 4:
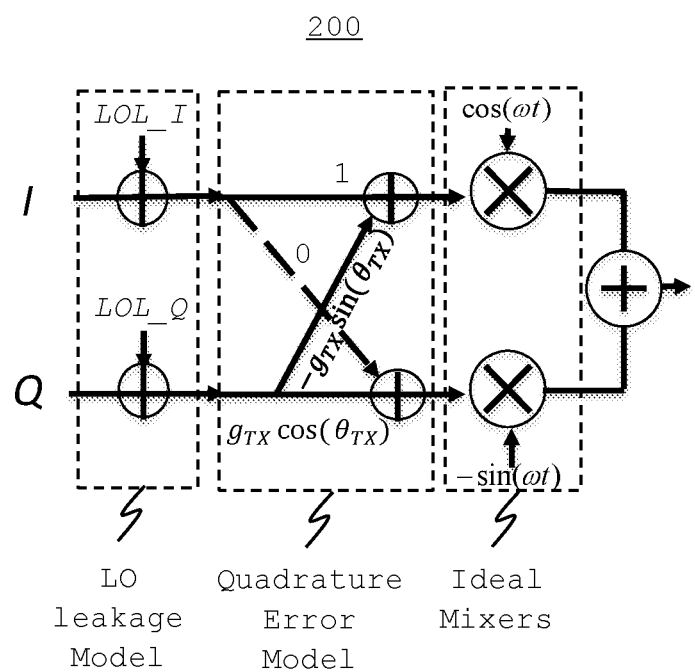
FIG. 4 is an illustrative block diagram of a model of an ideal mixer.

LO leakage and quadrature errors may thus be introduced in the part of the RF transceiver denoted 120 in FIG. 3. The contribution of the LO leakage and quadrature errors to the signals may be modeled as shown in FIG. 4. In the model 200 of FIG. 4, an I signal path may be infected by LO leakage (LOL_I) and a Q signal path may be infected by LO leakage (LOL_Q). The signals on the I and Q signals paths originate, e.g., from the DACs 102a, 102b as shown in FIG. 3. A gain error ($g_{TX}$) and phase imperfections ($\cos(\theta_{TX})$ and $\sin(\theta_{TX})$) may result in quadrature errors added to the I and Q signal paths. This may result in a quadrature error component of $-g_{TX} \sin(\theta_{TX})$ to the I signal path and a quadrature error component of $g_{TX} \cos(\theta_{TX})$ to the Q signal path. The RF mixers, e.g., RF mixers 108a, 108b shown in FIG. 3, are modeled as ideal mixers in FIG. 4, realizing a 90° phase split by applying factors $\cos(\omega t)$ and $-\sin(\omega t)$ to the I and Q signal paths to obtain the I signal and the Q signal, respectively.

Figure 5:
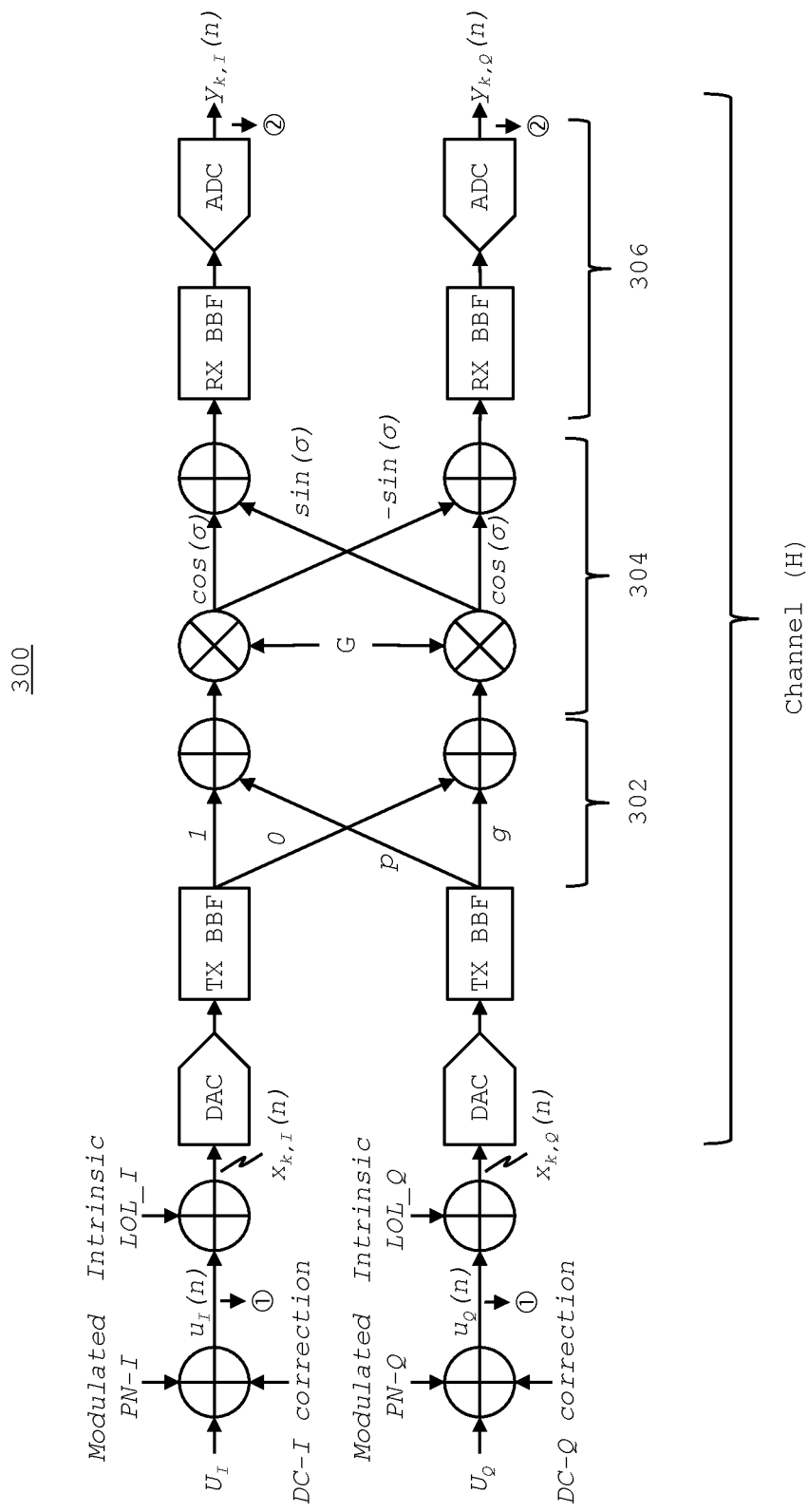
FIG. 5 is an illustrative block diagram of a channel model between a transmitter and a receiver.

FIG. 5 shows a model 300 of a signal path between a transmitter (TX) and a receiver (RX). The signal path shown in FIG. 5 includes an upper path for the I component $U_I$ of an I/O user signal and a lower path for the Q component $U_Q$ of the I/O user signal.

As will be further described below, the $U_I$ and $U_Q$ signals may be modified by a modulated PN sequence, e.g., modulated PN-I for the $U_I$ signal and modulated PN-Q for the $U_Q$ signal. Herein, PN, also known as pseudorandom noise, is a signal similar to noise which satisfies one or more standard tests for statistical randomness. A PN sequence typically includes a deterministic sequence of pulses or binary zeros and ones that repeats itself after a predefined period.

Furthermore, the $U_I$ and $U_Q$ signals may be modified by a direct current (DC) correction signal, e.g., DC-I correction for the $U_I$ signal and DC-Q correction for the $U_Q$ signal. The resulting signals are denoted $u_I(n)$ and $u_Q(n)$.

Contribution of LO leakage is shown in FIG. 5 in the Intrinsic LOL_I and Intrinsic LOL_Q components added to the $u_I(n)$ and $u_Q(n)$ signals in the I and Q signal paths, respectively.

With reference to the model shown in FIG. 5, a composite channel model (H) may be defined between the DACs of a TX, e.g., DACs 102a and 102b of FIG. 3, and analog-to-digital converters (ADC) of an observation receiver (RX) 306. The composite channel model may result from a cascading quadrature error model 302, e.g., similar to FIG. 4, a loopback bridge model 304 to model the signal as will be transmitted by a transmitter of the TX and received by the RX, and transmitter and receiver gains G. In the example of FIG. 5, the loopback bridge 304 is assumed to be ideal, i.e., only a gain and phase rotation is presented between the TX and loopback RX signals, as reflected by the $\cos(\sigma)$ and $\pm\sin(\sigma)$ manipulations to the I and Q signal components.

In the model of FIG. 5, the TX signal goes through an TX RF front end and is fed back to the observation receiver 306. The composite channel model H may then be modeled as follows. Assume that there are K transmit blocks in which each block has N samples. Let $x_k(n)=[x_{k,I}(n),x_{k,Q}(n)]^T$ denote the nth transmitted sample of the kth block in which I and Q indicate the sample transmitted on the in-phase and quadrature signal. Similarly, let $y_k(n)=[y_{k,I}(n),y_{k,Q}(n)]^T$ denote the nth received sample of the kth block on the observation RX receiver.

The composite channel H between $y_k(n)$ and $x_k(n)$ may be denoted by a 2×2 real matrix H, where $$H = \begin{bmatrix} h_{11} & h_{12} \\ h_{21} & h_{22} \end{bmatrix}.$$

With reference to FIG. 5, H can be rewritten as:

$$H = G * \begin{bmatrix} 1 & p \\ 0 & g \end{bmatrix} * \begin{bmatrix} \cos(\sigma) & \sin(\sigma) \\ -\sin(\sigma) & \cos(\sigma) \end{bmatrix}. \quad \text{(formula 1)}$$

The RX-TX relation may be modeled as follows:

$$y_k(n) = H * x_k(n) + w_k(n), \quad \text{(formula 2)}$$

in which $w_k(n)$ may be 2×1 additive white Gaussian noise vector at the receiver whose distribution follows $w_k(n) \sim N(0, g_w * I_2)$.

Formulas 1 and 2 will be further used in the description below.

The signals $u_I(n)$ and $u_Q(n)$ representing the signals at the TX prior to LO leakage errors and quadrature errors may be fed to a TX accumulator for further analysis, denoted by the symbol ① in FIG. 5. The signals $y_{k,I}(n)$ and $y_{k,Q}(n)$ signals representing the signals as received by the RX 306 may be fed to an RX accumulator for further analysis, denoted by the symbol ② in FIG. 5.

The $U_I$ and $U_Q$ signals may be multiplied by a PN sequence that has a much higher bit rate than the original data rate. The PN sequence is then also known as a PN spreading sequence. The resulting transmitted signal may resemble bandlimited white noise. This noise-like signal may be used to reconstruct the original data at the receiving end, e.g., by multiplying the signal by the same PN sequence. This process, known as despreading, may mathematically be a correlation of the transmitted PN sequence with the PN sequence that the receiver already knows the transmitter is using. After the despreading, a signal-to-noise ratio may approximately be increased by a spreading factor, which is the ratio of the spreading-sequence rate to the data rate.

The present disclosure provides a method and a system to estimate LO leakage and quadrature error parameters for a transmitter RF front end, such as a direct up-conversion transmitter RF front end, advantageously in a joint fashion. The proposed method utilizes a PN sequence inserted at the transmitter baseband, such as the modulated PN-I and modulated PN-Q sequences shown in FIG. 5. At the observation receiver side, an RX accumulator is implemented to sum receiver signals to take advantage of a despreading gain using the same PN sequence from transmitter side. Through the despreading process, the receiver-transmitter channel, such as the composite channel model H shown in FIG. 5, may be estimated. The estimated channel H may be used to extract the quadrature error parameters. The estimated channel H may also be used to eliminate the user data interference presented within the RX accumulator output, which may further be used to compute the LO leakage.

Advantages of the proposed method and system include: 1) the added PN sequence may have zero DC mean added to the user data, hence it is suitable for systems which carry information on DC; 2) it allows simultaneous estimation of quadrature error and LO leakage using the same set of data captures to reduce data capture length and speed up estimation time—this is critical in, e.g., fast frequency hopping environments; and 3) it allows the added PN sequence power to be very low with long PN sequences providing large spreading/despreading gain.

As will be appreciated by one skilled in the art, aspects of the present disclosure may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon.

The following detailed description presents various descriptions of specific certain embodiments. However, the innovations described herein can be embodied in a multitude of different ways, for example, as defined and covered by the claims and/or select examples. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the present disclosure, if used, the terms "substantially," "approximately," "about," etc., may be used to generally refer to being within +/− 20% of a target value, e.g., within +/−10% of a target value, based on the context of a particular value as described herein or as known in the art. For the purposes of the present disclosure, the phrase "A and/or B" or notation "A/B" means (A), (B), or (A and B). For the purposes of the present disclosure, the phrase "A, B, and/or C" or notation "A/B/C" mean (A), (B), (C), (A and B), (A and C), (B and C), or (A, B, and C).

Other features and advantages of the disclosure will be apparent from the following description and the claims.

Example Transceiver Front End

Figure 6:
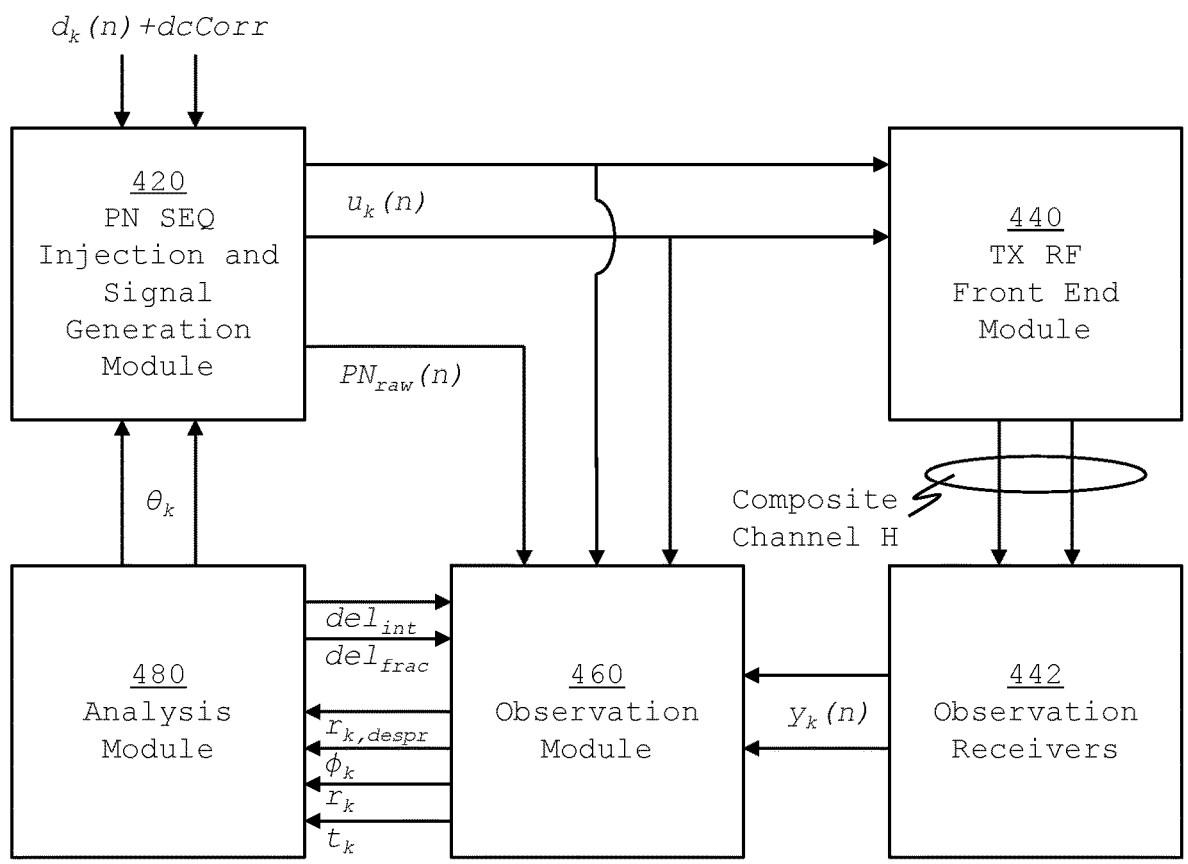
FIG. 6 shows an illustrative transceiver front end, according to some embodiments of the present disclosure.

FIG. 6 shows a block diagram of an example transceiver front end 400 used to estimate LO leakage and quadrature errors in a joint fashion, in accordance with some embodiments. The transceiver front end 400 may be integrated into an RFIC. The transceiver front end 400 may be a direct conversion (e.g., zero-IF) front end.

In some embodiments the transceiver front end 400 may operate in a calibration mode, wherein the LO leakage and quadrature errors may be determined without actually transmitting signals to a receiver. After calibration, the transceiver front end 400 may be set to an operational mode, wherein signals are transmitted to a receiver.

The transceiver front end 400 may include a PN sequence injection and signal generation module 420. The PN sequence injection and generation module 420 may be configured to receive user data $d_k(n)$, which may include a correction factor dcCorr. In FIG. 6, the two arrows for $d_k(n)$+dcCorr represent the I and Q signal paths for the user data. The PN sequence injection and signal generation module 420 may further be configured to receive PN scaling factors $\theta_k$ from a analysis module 480 for each of the I and Q signal paths. The PN sequence injection and signal generation module 420 may be configured to generate a user signal including a PN sequence (depicted $u_k(n)$ in FIG. 6 for both I and Q signal paths) from the user data $d_k(n)$, wherein the PN sequence is based on the scaling factors $\theta_k$. The $u_k(n)$ signals may be output to a TX RF front end module 440 and to an observation module 460. A raw PN sequence $PN_{raw}(n)$ generated in the PN sequence injection and signal generation module 420 may be output to the observation module 460. The PN sequence injection and signal generation module 420 will be further described in FIG. 7.

The transceiver front end 400 may include a TX RF front end module 440. The TX RF front end module 440 may be configured to receive the $u_k(n)$ signals from the PN sequence injection and signal generation module 420. The TX RF front end module 440 may introduce LO leakage signals to the $u_k(n)$ signals. The TX RF front end module 440 transmits the signals to one or more observation receivers 442. The TX RF front end module 440 will be further described in FIG. 8.

The transceiver front end 400 may include one or more observation receivers 442, which represent one or more receivers of the signal transmitted by the TX RF front end 440. The observation receivers 442 may be configured to provide the received signals $y_k(n)$ to the observation module 460 for further processing.

When transmitting the signals to a receiver, quadrature errors may be introduced to the signals. In FIG. 6, a composite channel H is shown, which may be modeled to represent the quadrature errors, e.g., as shown in the example of FIG. 5. In a calibration mode, the TX RF front end module 440, the composite channel H and observation receivers 442 may be implemented as system properties, i.e., a model representing an actual transmission path and resulting in the $u_k(n)$ signals input to the TX RF front end module 440 to be modified into signal $y_k(n)$ without being actually transmitted.

The transceiver front end 400 may include an observation module 460. The observation module 460 may be configured to receive the $u_k(n)$ signals and a raw PN sequence $PN_{raw}(n)$ from the PN sequence injection and signal generation module 420. The observation module 460 may further be configured to receive the $y_k(n)$ signals from the observation receivers 442. The observation module 460 may use integer delay values $del_{int}$ and fractional delay values $del_{frac}$, e.g., received from the analysis module 480 for signal synchronization purposes. Based on the various input signals, the observation module 460 may generate accumulated user signals $t_k$ from the received $u_k(n)$ signals, despreaded accumulated user signals $\phi_k$ from the received $u_k(n)$ signals, accumulated receiver signals $r_k$ from the received $y_k(n)$ signals and despreaded accumulated receiver signals $r_{k,despr}$ from the received $y_k(n)$ signals. The $t_k$, $\phi_k$, $r_k$ and $r_{k,despr}$ signals may be output to the analysis module 480 for further processing. The observation module 460 will be further described in FIG. 10.

The transceiver front end 400 may further include an analysis module 480. The analysis module 480 may be configured to generate the scaling factors $\theta_k$ for use by the PN sequence injection and signal generation module 420. The analysis module 480 may be configured to generate integer delay values $del_{int}$ and fractional delay values $del_{frac}$ for use by the observation module 460. The analysis module 480 may be configured to analyze the $t_k$, $\phi_k$, $r_k$ and $r_{k,despr}$ signals obtained from the observation module 460 and based on the outcome of this analysis, calculate LO leakage and quadrature error parameters for the transceiver front end 400. The analysis module 480 will be further described in FIG. 12.

Example PN Sequence Injection and Signal Generation Module

Figure 7:
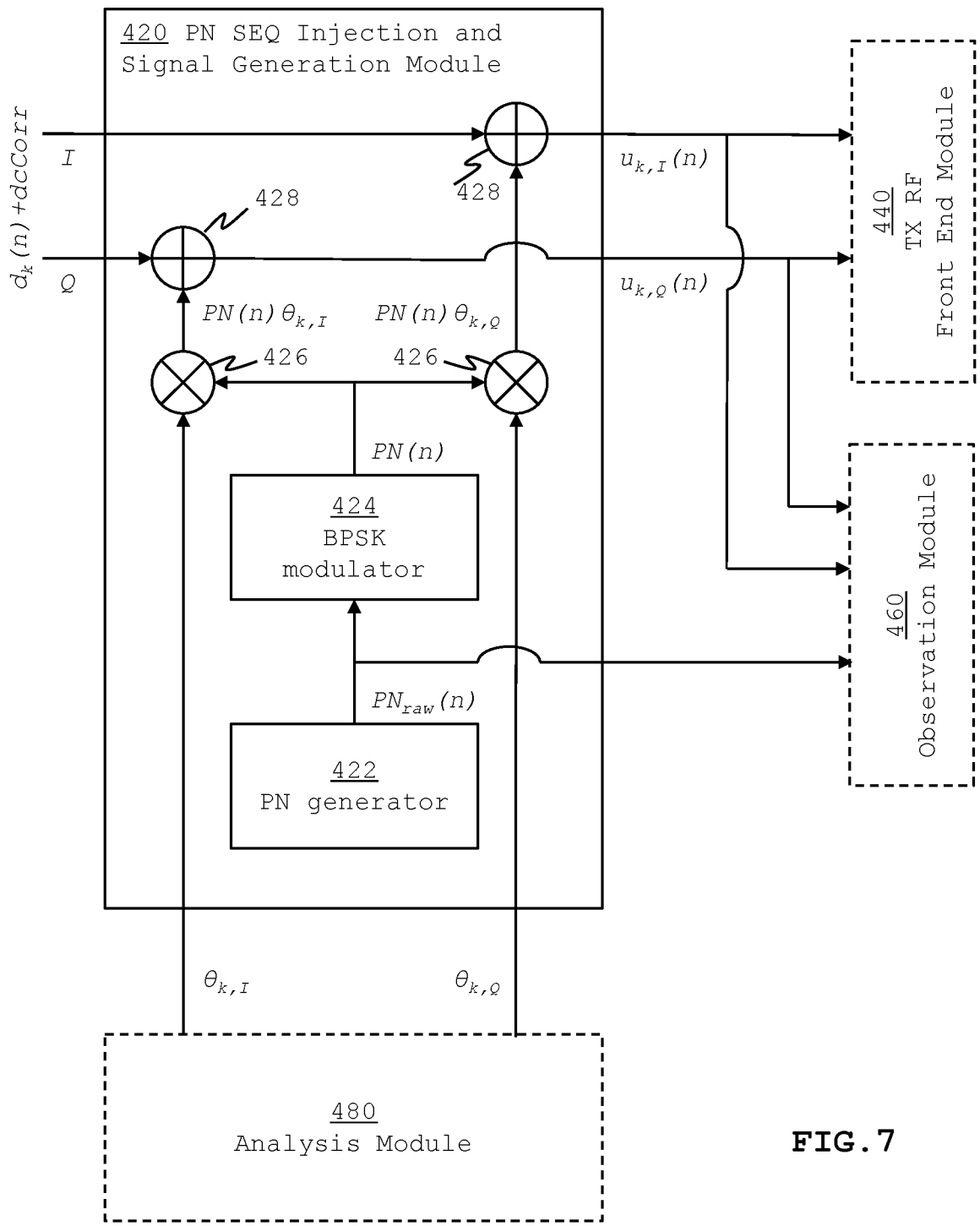
FIG. 7 shows a pseudo-noise (PN) sequence injection and signal generation module, according to some embodiments of the present disclosure.

FIG. 7 shows an example of a PN sequence injection and signal generation module 420, such as shown in FIG. 6, in more detail. Besides the PN sequence injection and signal generation module 420, dashed modules are shown that are communicatively connected to the PN sequence injection and signal generation module 420. I.e., TX RF front end module 440, observation module 460 and analysis module 480 are shown as dashed boxes. In FIG. 7, the $u_k(n)$ signals are shown in their separate forms $u_{k,I}(n)$ and $u_{k,Q}(n)$ for the I and Q signal paths, respectively. Also, the scaling factors $\theta_k$ are shown in their separate forms $\theta_{k,I}$ and $\theta_{k,Q}$ for each of the I and Q signal paths.

The PN sequence injection and signal generation module 420 may include a PN generator 422 for generating the raw PN sequence $PN_{raw}(n)$. A binary phase-shift keying (BPSK) modulator may generate a PN(n) sequence according to the standard BPSK modulation scheme. The PN(n) sequence and the scaling factors $\theta_k$ may be fed to in-phase and quadrature scaling modules 426 to generate scaled PN(n) sequences $PN(n)\theta_{k,I}$ and $PN(n)\theta_{k,Q}$ for each of the I and Q signal paths. Adders 428 may add the thus obtained scaled $PN(n)\theta_{k,I}$ and $PN(n)\theta_{k,Q}$ to the user data $d_k(n)$, possibly including a dcCorr component, to obtain the $u_{k,I}(n)$ and $u_{k,Q}(n)$ signals for the I and Q signal paths.

The PN sequence injection and signal generation module 420 may be implemented as a software controlled hardware module or a digital circuit. Alternatively, the PN sequence injection and signal generation module 420 may be implemented in software.

Example TX Front End Module

Figure 8:
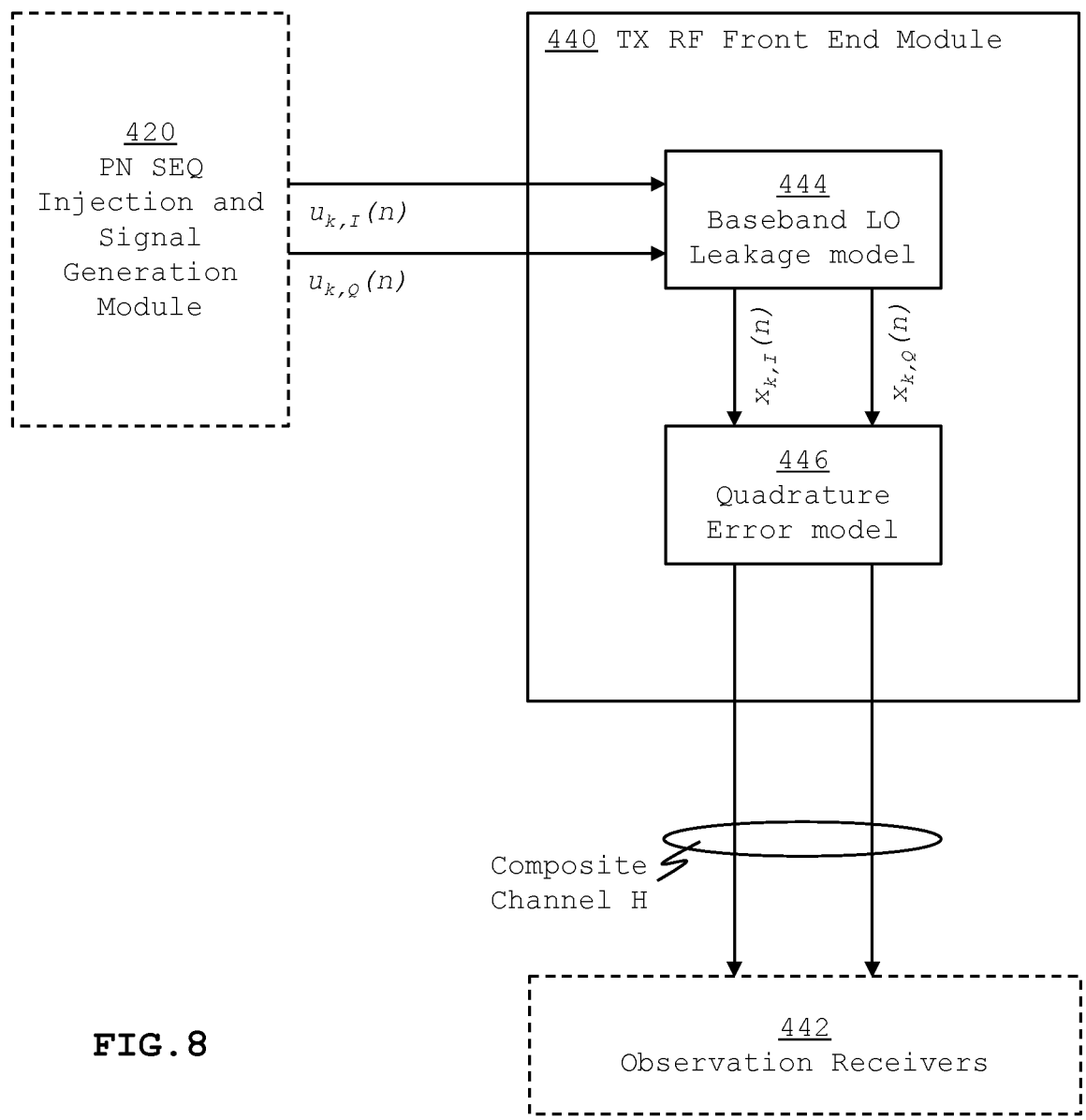
FIG. 8 shows a transmitter (TX) RF front end, according to some embodiments of the present disclosure.

FIG. 8 shows an example of a TX RF front end module 440, such as shown in FIG. 6, in more detail. Besides the TX RF front end module 440, dashed modules are shown that are communicatively connected to the TX RF front end module 440. I.e., PN sequence injection and signal generation module 420 and observation receivers 442 are shown as dashed boxes.

The TX RF front end module 440 may include a baseband LO leakage model, which may be used, e.g., in a calibration mode, to add LO leakage signals to the input signals to generate the $x_{k,I}(n)$ and $x_{k,Q}(n)$ signals. The TX RF front end module 440 may further include a quadrature error model 446, which may be used, e.g., in a calibration mode, to add quadrature errors to the $x_{k,I}(n)$ and $x_{k,Q}(n)$ signals before transmission of the signals to the observation receivers 442.

Figure 9:
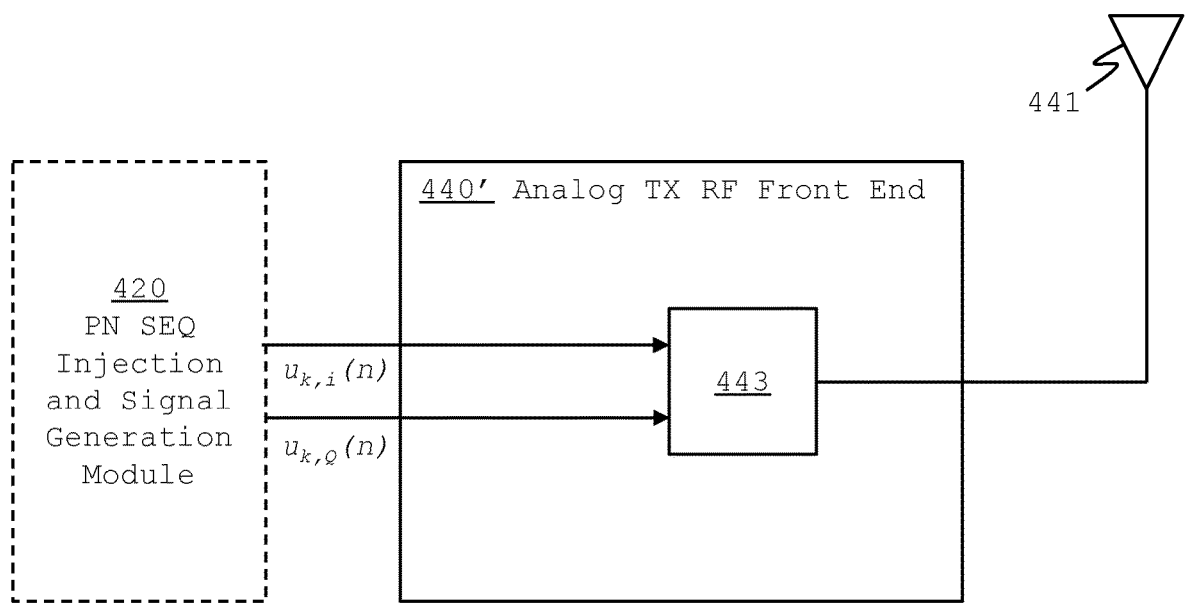
FIG. 9 shows an analog TX RF front end, according to some embodiments of the present disclosure.

When the transceiver front end is not operating in a calibration mode, the TX RF front end module may be configured to operate as an analog TX RF front end 440' as shown in FIG. 9. In FIG. 9, the analog TX RF front end includes an RF module 443 that prepares the $u_{k,I}(n)$ and $u_{k,Q}(n)$ signals for transmission via one or more antennas 441. The RF module 443 may include various hardware components, such as a power amplifier 112 as shown in FIG. 3.

In some embodiments, the configurations of FIG. 8 and FIG. 9 may be used simultaneously. The transceiver may then be calibrated using a configuration such as shown in FIG. 8, while transmitting the signals using a configuration such as shown in FIG. 9.

Example Observation Module

Figure 10:
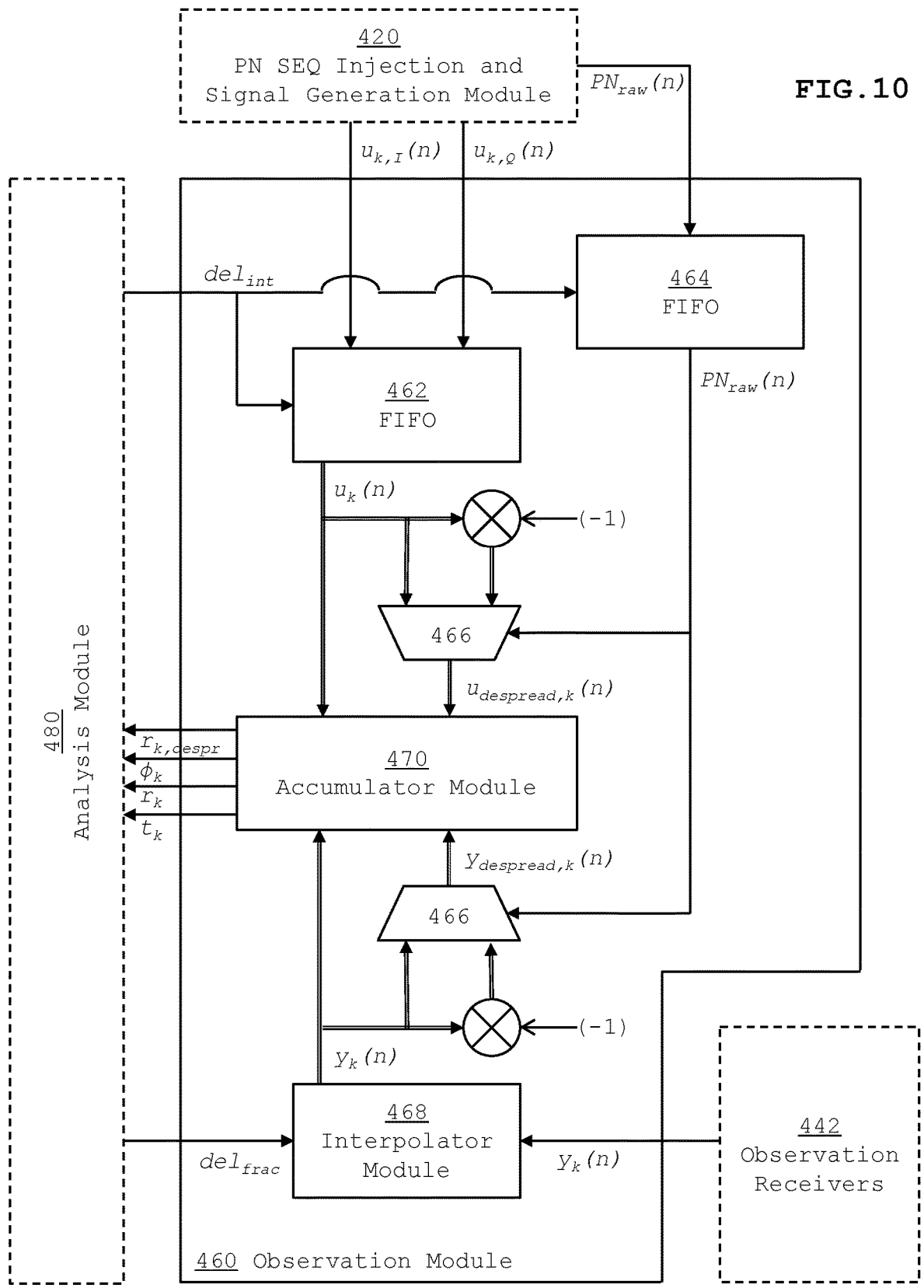
FIG. 10 shows an observation module, according to some embodiments of the present disclosure.

FIG. 10 shows an example of an observation module 460, such as shown in FIG. 6, in more detail. Besides the observation module 460, dashed modules are shown that are communicatively connected to the observation module 460. I.e., PN sequence injection and signal generation module 420, observation receivers 442 and analysis module 480 are shown as dashed boxes.

The observation module 460 may include a first first-in-first-out (FIFO) buffer 462 for receiving the $u_{k,I}(n)$ and $u_{k,Q}(n)$ signals from the PN sequence injection and signal generation module 420. The observation module 460 may further include a second FIFO buffer 464 for receiving the $PN_{raw}(n)$ signals from the PN sequence injection and signal generation module 420. Signal synchronization may be applied by FIFOs 462, 464 using the $del_{int}$ values received from the analysis module 480. The first FIFO may output the received $u_k(n)$ signals, i.e., for both I and Q signal paths, to an accumulator module 470. A delayed version of the $u_k(n)$ signals may be input, together with the $u_k(n)$ signals, to a despreader 466 to obtain despreaded $u_{despread,k}(n)$ signals. The $PN_{raw}(n)$ signals from the second FIFO 464 may be used in the despreading operation. The $u_{despread,k}(n)$ signals may be input to the accumulator module 470.

The $y_k(n)$ signals received from the observation receivers 442 may be received by an interpolator module 468, which may use the $del_{frac}$ values from the analysis module to synchronize the received signals. In, e.g., a calibration mode, the $y_k(n)$ signals may be received by processing the $u_k(n)$ signals through a model of the TX RF front end 440 and transmission channel H, as described above. The interpolator module 468 may output the $y_k(n)$ signals, i.e., for both I and Q signal paths, to the accumulator module 470. A delayed version of the $y_k(n)$ signals may be input, together with the $y_k(n)$ signals, to a despreader 466 to obtain despreaded $y_{despread,k}(n)$ signals. The $PN_{raw}(n)$ signals from the second FIFO 464 may be used in this despreading operation. The $y_{despread,k}(n)$ signals may be input to the accumulator module 470.

The accumulator module 470 may accumulate the received signals and output the thus obtained $t_k$, $\phi_k$, $r_k$ and $r_{k,despr}$ signals to the analysis module 480 for further processing. The accumulator module 470 will be further described in FIG. 11.

The observation module 460 may be implemented in hardware. The accumulators may be implemented as a digital circuit. Alternatively, the accumulators may be implemented in software.

Example Accumulator Module

Figure 11:
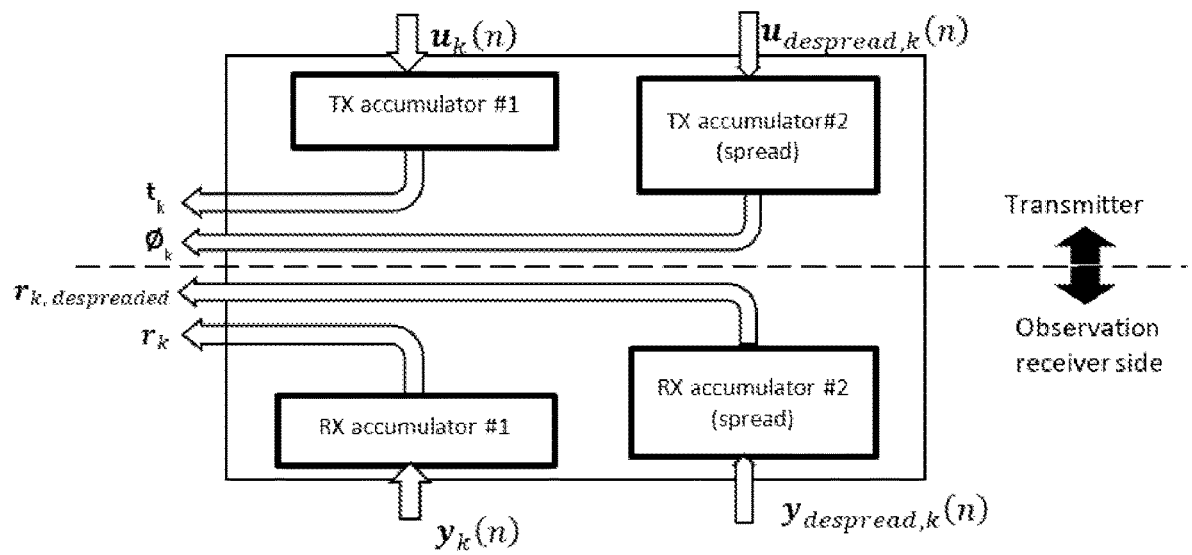
FIG. 11 shows an accumulator module, according to some embodiments of the present disclosure.

The accumulator module 470 may be implemented in various manners. One example is shown in FIG. 11, wherein the accumulator module 470 includes a transmitter side and an observation receiver side. At the transmitter side, a first TX accumulator #1 may receive the $u_k(n)$ signals and output the thus obtained $t_k$ signals. A second TX accumulator #2 may receive the $u_{despread,k}(n)$ signals and output the thus obtained $\phi_k$ signals. At the observation receiver side, a first RX accumulator #1 may receive the $\phi_k(n)$ signals and output the thus obtained $r_k$ signals. A second RX accumulator #2 may receive the $y_{despread,k}(n)$ signals and output the thus obtained $r_{k,despreaded}$ signals.

The accumulators may be implemented as complex accumulators, e.g., one for the transmitter side data and one for the observation receiver side data.

Example Analysis Module

Figure 12:
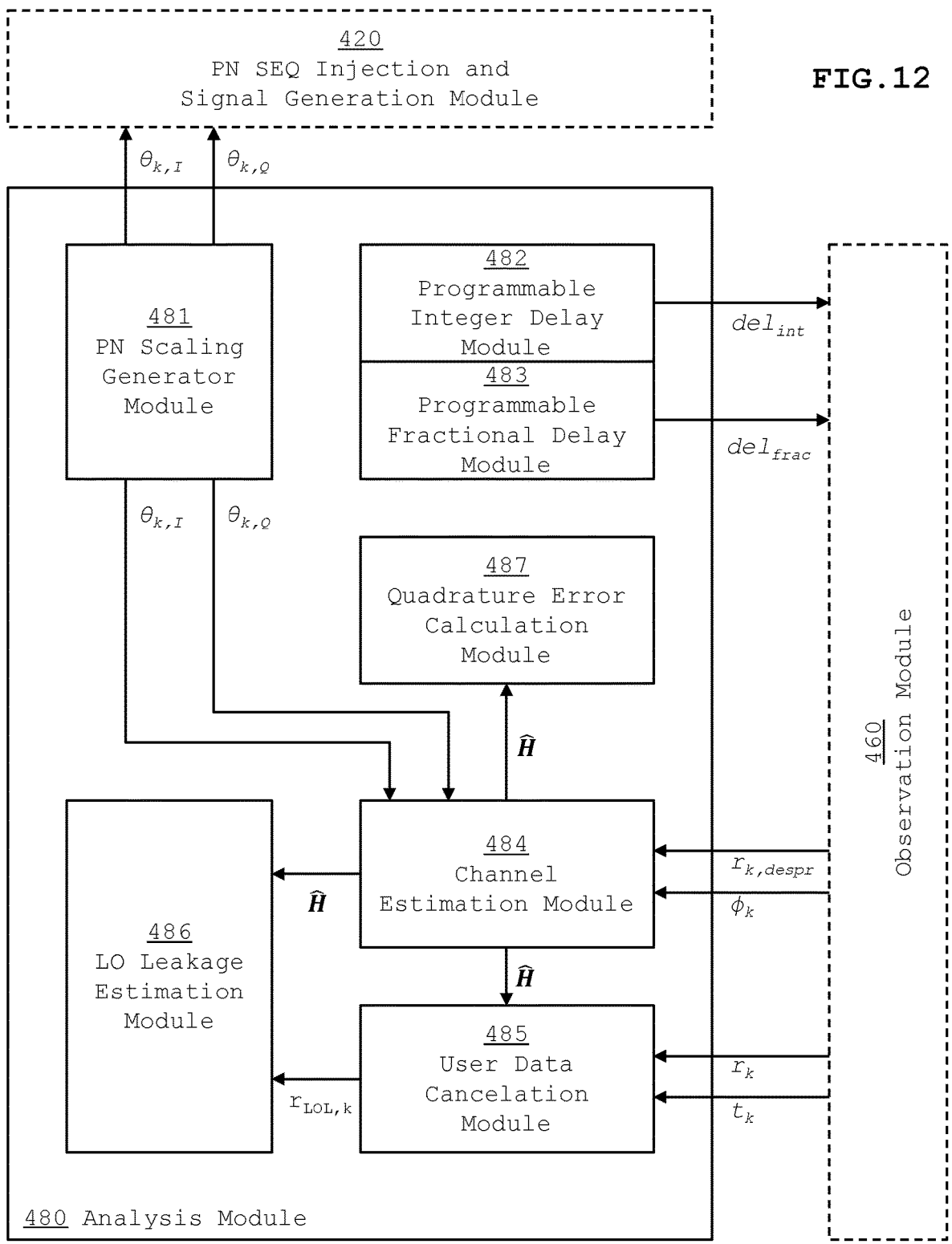
FIG. 12 shows an analysis module, according to some embodiments of the present disclosure.

FIG. 12 shows an example of an analysis module 480, such as shown in FIG. 6, in more detail. Besides the analysis module 480, dashed modules are shown that are communicatively connected to the analysis module 480. I.e., PN sequence injection and signal generation module 420 and observation module 460 are shown as dashed boxes.

The analysis module 480 may include a PN scaling generator module 481 for generating the scaling factors $\theta_{k,I}$ and $\theta_{k,Q}$. The scaling factors $O_{k,I}$ and $O_{k,Q}$ may be output to the PN sequence injection and signal generation module 420. The analysis module 480 may include a programmable integer delay module 482 and a programmable fractional delay module 483 for generating the $del_{int}$ and $del_{frac}$ values, respectively.

A channel estimation module 484 may be configured to receive the $\phi_k$ and $r_{k,despr}$ signals from the observation module 460. The channel estimation module 484 may be configured to determine the characteristics of the composite channel $\hat{H}$ based on the received $\phi_k$ and $r_{k,despr}$ signals.

The thus obtained channel characteristics $\hat{H}$ may be input to a user data cancelation module 485. The user data cancelation module 485 may further receive the $t_k$ and $r_k$ signals from the observation module 460. The user data cancelation module 485 may be configured to cancel interference and generate $r_{LOL,k}$ based on the received $t_k$ and $r_k$ signals and channel characteristics $\hat{H}$.

A LO leakage estimation module 486 may estimate the LO leakage in the transceiver front end based on the channel characteristics $\hat{H}$ obtained from the channel estimation module 484 and the $r_{LOL,k}$ obtained from the user data cancelation module 485.

A quadrature error calculation module 487 may calculate the quadrature error in the transceiver front end based on the channel characteristics $\hat{H}$ obtained from the channel estimation module 484.

Thus, the LO leakage and quadrature error parameters may be estimated simultaneously by the analysis module 480. The obtained LO leakage and quadrature error parameters may be used to configure the transceiver front end 400 to compensate for LO leakage and quadrature errors.

In an example embodiment, the calculated LO leakage may be used to update dcCorr to compensate LO leakage. For quadrature error correction, the calculated quadrature error may be used to drive an actuator before LO leakage correction (not shown in FIG. 6).

The analysis module 480 may be implemented in firmware, e.g., a firmware of the transceiver front end 400.

Signal Injection and Solver Modeling

In the following sections, signal injection and solver modeling for obtaining the LO leakage and quadrature errors parameters will be explained in more detail. Reference will be made to elements shown in FIGS. 6-12.

Signal Injection and Solver Modeling—Injection of PN Sequence to the Transmitter In the kth transmission block's nth sample, a PN generator module, e.g., the PN generator 422, may generate $PN_{raw}(n)$. Then $PN_{raw}(n)$ may be fed into a BPSK modulator, e.g., BPSK modulator 424, to generate PN sequence $PN(n) \in \{-1,1\}$, according to standard BPSK modulation, i.e., $$PN(n) = \begin{cases} 1, & \text{if } PN_{raw}(n) = 0 \\ -1, & \text{if } PN_{raw}(n) = 1. \end{cases} \quad \text{(formula 3)}$$

PN(n) may be fed into in-phase and quadrature scaling modules, e.g., in-phase and quadrature scaling modules 428, to obtain appropriate scaling. Specifically, the scalers for I and Q may be written into a vector form:

$$\theta_k = g_{PN} * \left[\cos\left(\frac{k}{K} * 2pi\right), \sin\left(\frac{k}{K} * 2pi\right)\right]^T. \quad \text{(formula 4)}$$

Herein, $g_{PN}$ is a magnitude of the PN sequence which may be selected to be small enough compared to the user data, such that it does not affect the transmit signal quality.

Note $\theta_k$ may be selected other than the values specified in formula 4, such that $[\theta_0, \theta_1, \ldots, \theta_{K-1}][\theta_0, \theta_1, \ldots, \theta_{K-1}]^T$ is a rank two matrix and has a small condition number.

The output from the in-phase and quad scaling modules may be written into a vector form as $PN(n)\theta_k$. The $PN(n)\theta_k$ may be summed with user data $d_k(n)$ on the data path and fed into the transmitter front end, e.g., TX RF front end 440, and a loopback bridge for feeding into the observation module 460. Thus, the following signal is obtained:

$$u_k(n)=d_k(n)+\theta_k*PN(n)+dc\text{Corr}, \quad \text{(formula 5)}$$

where $d_k(n)$ is the user data of the nth sample of the kth block. Note the additional term of dcCorr may also be added to the right-hand side of formula 5, which represents the LO leakage correct values added to the data path.

LO leakage may be added to the $u_k(n)$ at the TX front end, generating the transmit data $x_k(n)$, i.e., $x_k(n)=u_k(n)+\text{LOL}$. Herein, $\text{LOL}=[\text{LOL}_i, \text{LOL}_q]^T$ is the LO leakage and is assumed to be a constant across K transmit blocks.

Signal Injection and Solver Modeling—Signal at the Observation Receiver

Then $x_k(n)$ may be fed into the loopback bridge for feeding into the observation module 460. According to the models introduced in FIGS. 4 and 5, the receiver signal may be represented by:

$$y_k^\delta(n)=H*(d_k(n-\delta)+N*\theta_k*PN(n-\delta)+dc\text{Corr}+\text{LOL})+w_k(n), n=0, 1, \ldots, N-1. \quad \text{(formula 6)}$$

Note that a delay term $\delta$ may be added to the equation which denotes the delay between received signal and transmit signal. H is a composite channel which contains quadrature error parameters as in formula 1.

Signal Injection and Solver Modeling—LO Leakage and Quadrature Error Solvers

Compute the Channel

The delay between RX from TX signals, $\delta$, may have an integer part and fractional part. The integer and fractional delays may be calculated in advance by a loopback path delay measurement module, which is not in the scope of this disclosure, and may be provided, e.g., by the programmable integer delay module 482 and the programmable fractional delay module 483. The integer delay may compensated at the TX FIFO, such as FIFOs 462 and 464; the fractional delay may be compensated using an RX interpolator, such as interpolator module 468. These two operations may be equivalent to remove the delay and result in a RX signal of:

$$y_k(n)=H*(d_k(n)+N*\theta_k*PN(n)+dc\text{Corr}+\text{LOL})+w_k(n), n=0, 1, \ldots, N-1. \quad \text{(formula 7)}$$

After collecting all N samples for the kth block, these samples may be combined at the RX correlator after multiplying the same PN sequence PN(n) at the despreader, such as despreader 466, according to the below equation:

$$r_{k,despreaded} = \Sigma_{n=0, \ldots, N-1} y_{despread,k}(n) \triangleq \Sigma_{n=0, \ldots, N-1}(y_k(n)*PN(n)) \quad \text{(formula 8)}$$

Herein, $y_{despread,k}(n) \overset{def}{=} PN(n)*y_k(n)$. The right-hand side of formula 8 can be rearranged into the following form by noting that $PN(n)^2=1$:

$$r_{k,despreaded} = \sum_{n=0,\ldots,N-1} ((H*(d_k(n)+\theta_k*PN(n)+dc\text{Corr}+\text{LOL})+w_k(n))*PN(n)) =$$
$$H*\left(N*\theta_k + \sum_{n=0,\ldots,N-1}(d_k(n)+dc\text{Corr})*PN(n)\right) +$$
$$H*\text{LOL}*\sum_{n=0,\ldots,N-1}(PN(n)) + H*\sum_{n=0,\ldots,N-1}(w_k(n)*P(n))$$

The second and third terms of the right-hand side of formula 9 may be suppressed due to the despreading process, which results in a simplified formula for the kth block:

$$r_{k,despreaded}=H*\phi_k. \quad \text{(formula 10)}$$

where $\phi_k \overset{def}{=} N*\theta_k + \Sigma_{n=0,\ldots,N-1}(d_k(n)+dc\text{Corr})*PN(n)$.

All $r_{k,despreaded}$, (k=0, ..., K-1) may be combined into a matrix form as at a module of channel estimation, such as channel estimation module 484, as:

$$R=H*\Sigma. \quad \text{(formula 11)}$$

Herein, $R \overset{def}{=} [r_{0,despreaded}, r_{1,despreaded}, \ldots, r_{K-1,despreaded}]$, and $\Sigma \overset{def}{=} [\phi_0, \phi_1, \ldots, \phi_{\phi K-1}]$. $\phi_k$ may be provided by the TX accumulator, such as TX accumulator #1, through a despreading process. Recall transmit signal in formula 5. TX accumulator may output: $\Sigma_{n=0, 1, \ldots, N} u_{despread,k}(n) = \Sigma_{n=0,1,\ldots,N} PN(n)*(d_k(n)+\theta_k*PN(n)+dc\text{Corr}) \triangleq \phi_k$, where $u_{despread,k}(n) \overset{def}{=} PN(n)*u_k(n)$. H may then be solved in the channel estimation module, such as channel estimation module 484, using:

$$\hat{H} = \frac{1}{N}*R*\Sigma^T*\left(\Sigma*\Sigma^T\right)^{-1}. \quad \text{(formula 12)}$$

Note that the matrix inverse can be avoided by carefully selected parameters. An example is that to have K=2 blocks of data transmitted and $\theta_0=[g_{PN},0]^T$ and $\theta_1=[0, g_{PN}]^T$. In this example, the channel estimator can simply output $$\hat{H} = \frac{1}{N*g_{PN}}*[r_{0,despreaded}, r_{1,despreaded}],$$

if the term of $\Sigma_{n=0,\ldots,N-1}(d_k(n)+dc\text{Corr})*PN(n)$ is ignored due to large despreading gain.

Compute the Quadrature Parameters

The channel estimator $\hat{H}$ may be fed into a module of quadrature error estimator, such as quadrature error calculation module 487, which may calculate the quadrature error parameters according to the below equations:

$$\hat{p} = \frac{\hat{h}_{11} * \hat{h}_{12} + \hat{h}_{21} * \hat{h}_{22}}{\hat{h}_{11}^2 + \hat{h}_{21}^2} \quad \text{(formula 13)}$$

$$\hat{g} = \frac{\hat{h}_{11} * \hat{h}_{22} - \hat{h}_{21} * \hat{h}_{12}}{\hat{h}_{11}^2 + \hat{h}_{21}^2} \quad \text{(formula 14)}$$

$$\text{where } \hat{H} = \begin{bmatrix} \hat{h}_{11} & \hat{h}_{12} \\ \hat{h}_{21} & \hat{h}_{22} \end{bmatrix}.$$

User Data Cancelation

The receiver accumulator, such as RX accumulator #1, may also output the sum of the received samples of the kth block without despreading, which yields the below equation:

$$r_k \sum_{n=0,\ldots,N-1} (y_k(n)) = N * H * LOL + \quad \text{(formula 15)}$$
$$H * \sum_{n=0,\ldots,N-1} (d_k(n) + dcCorr + \theta_k * PN(n)) +$$
$$H * \sum_{n=0,\ldots,N-1} (w_k(n)).$$

The first term of right-hand side of formula 15 is the desired term to calculate LOL. $r_k$, k=0, 1, ... K−1 may be fed into a user data cancelation module, such as user data cancelation module 485, to eliminate the interference caused by user data.

Besides $r_k$, the TX accumulator may also output $t_k$, the sum of the samples of kth block of the TX data, to the user data cancelation module, such as user data cancelation module 485, i.e., $$t_k = \Sigma_{n=0,\ldots,N-1} d_k(n) + dcCorr + \theta_k * PN(n). \quad \text{(formula 16)}$$

The user data cancelation module may cancel the interference and generate $r_{LOL,k}$:

$$r_{LOL,k} = r_k - \hat{H} * t_k. = N * H * LOL + H * \sum_{n=0,\ldots,N-1} (w_k(n)). \quad \text{(formula 17)}$$

LO Leakage Computation $r_{LOL,k}$ may be fed to an LO leakage estimation module, such as LO leakage estimation module 486. In the LO leakage estimation module, $r_{LOL,k}$ may be summed together across all K blocks, which yields the next equation:

$$\Sigma_{k=0,\ldots,K-1} r_{LOL,k} = N*K*H*LOL + H* \Sigma_{n=0,\ldots,N-1,k=0,\ldots,K-1}(w_k(n)). \quad \text{(formula 18)}$$

The second term of formula 18 may be ignored due to large N*K. Then the LO leakage may be computed as:

$$LOL = 1/(N*K)*H^{-1}*\Sigma_{k=0,\ldots,K-1} r_{LOL,k} \quad \text{(formula 19)}$$

Example Method for Determining LO Leakage and Quadrature Error Parameters

Figure 13:
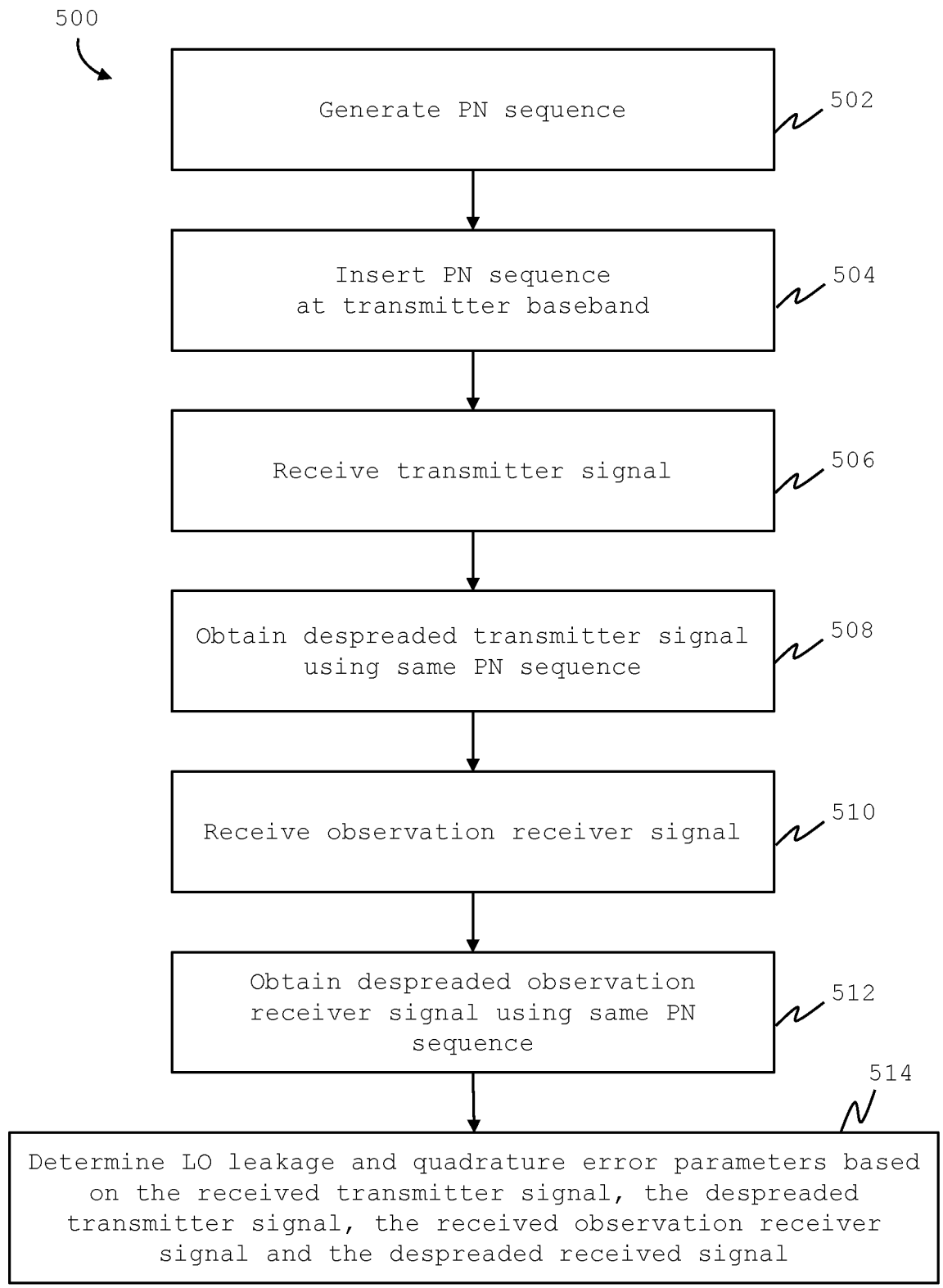
FIG. 13 is a flowchart of a method for determining LO leakage and quadrature error parameters, according to some embodiments of the present disclosure.

FIG. 13 shows a flow diagram of a method 500 for determining LO leakage and quadrature error parameters of a transceiver front end, such as transceiver front end 400 described with reference to FIGS. 6-12. Advantageously, this method allows to simultaneously determining both the LO leakage parameters and the quadrature error parameters.

In step 502 a PN sequence may be generated. The PN sequence is, e.g., generated by PN generator 422 as shown in FIG. 7. The In step 504 the PN sequence may be inserted into a user signal at the transmitter baseband, possibly after being processed by a BPSK modulator, such as BPSK modulator 424 as shown in FIG. 7. In step 506 the transmitter signals may be received, e.g., in observation module 460 as shown in FIG. 10. In step 508 the transmitter signals may be despreaded using the same PN sequence as inserted into the user signal. This despreading is, e.g., performed by the upper despreader 466 in FIG. 10. In step 510 observation receiver signals may be received, e.g., through the observation receivers 442 as shown in FIG. 6. The observation receiver signals may be received by applying a base band leakage model and quadrature error model to the transmitter signal to simulate an actual transmission, as described with reference to FIG. 8. In step 512 the observation receiver signals may be despreaded using the same PN sequence as inserted into the user signal. The despreading is, e.g., performed by the lower despreader 466 in FIG. 10. In step 514 the LO leakage parameters and quadrature error parameters may be determined based on the received transmitter signals, the despreaded transmitter signals, the received observation receiver signals and the despreaded received signals, e.g., as explained with reference to FIG. 12.

Determining Quadrature Error Parameters

Figure 14:
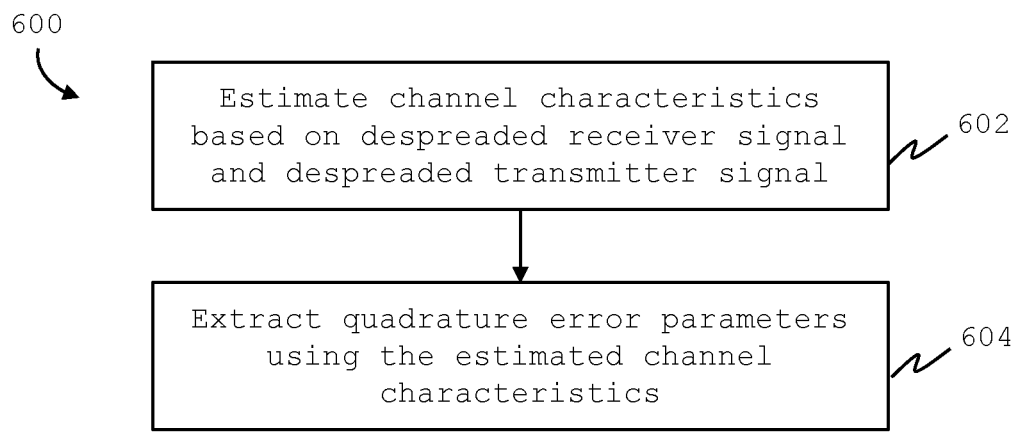
FIG. 14 is a flowchart of a method for estimating quadrature error parameters, according to some embodiments of the present disclosure.

FIG. 14 is a flow diagram of a method 600 for determining the quadrature error parameters, which may be part of step 514 of FIG. 13. In step 602 channel characteristics may be estimated based on despreaded receiver signals and despreaded transmitter signals. Step 602 may, e.g., be performed by channel estimation module 484. In step 604, quadrature error parameters may be extracted using the estimated channel characteristics. Step 604 may, e.g., be performed by quadrature error calculation module 487.

Computing LO Leakage Parameters

Figure 15:
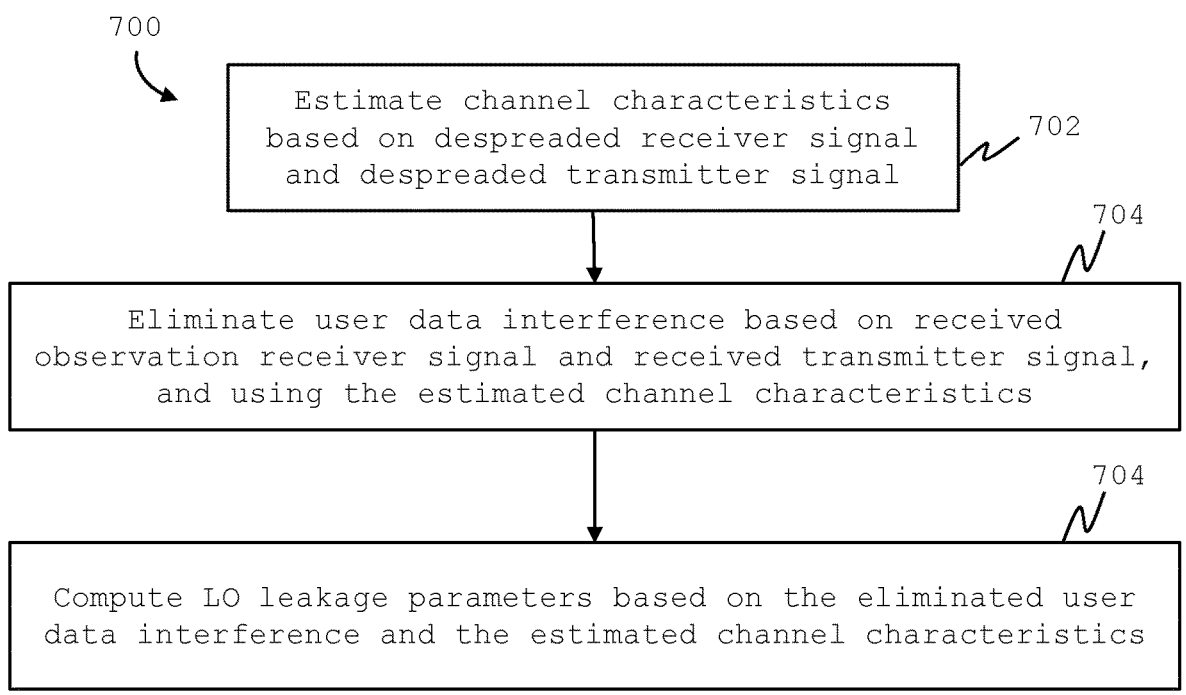
FIG. 15 is a flowchart of a method for computing LO leakage parameters, according to some embodiments of the present disclosure.

FIG. 15 is a flow diagram of a method 700 for computing LO leakage parameters, which may be part of step 514 of FIG. 13. In step 702 channel characteristics may be estimated based on despreaded receiver signals and despreaded transmitter signals. Step 702 may, e.g., be performed by channel estimation module 484. In step 704 user data interference may be eliminated based on received observation receiver signals and received transmitter signals, and using the estimated channel characteristics. Step 704 may, e.g., be performed by user data cancelation module 485. In step 706 LO leakage parameters may be computed based on the eliminated user data interference and the estimated channel characteristics. Step 704 may, e.g., be performed by LO leakage estimation module 486.

Example Data Processing System

Figure 16:
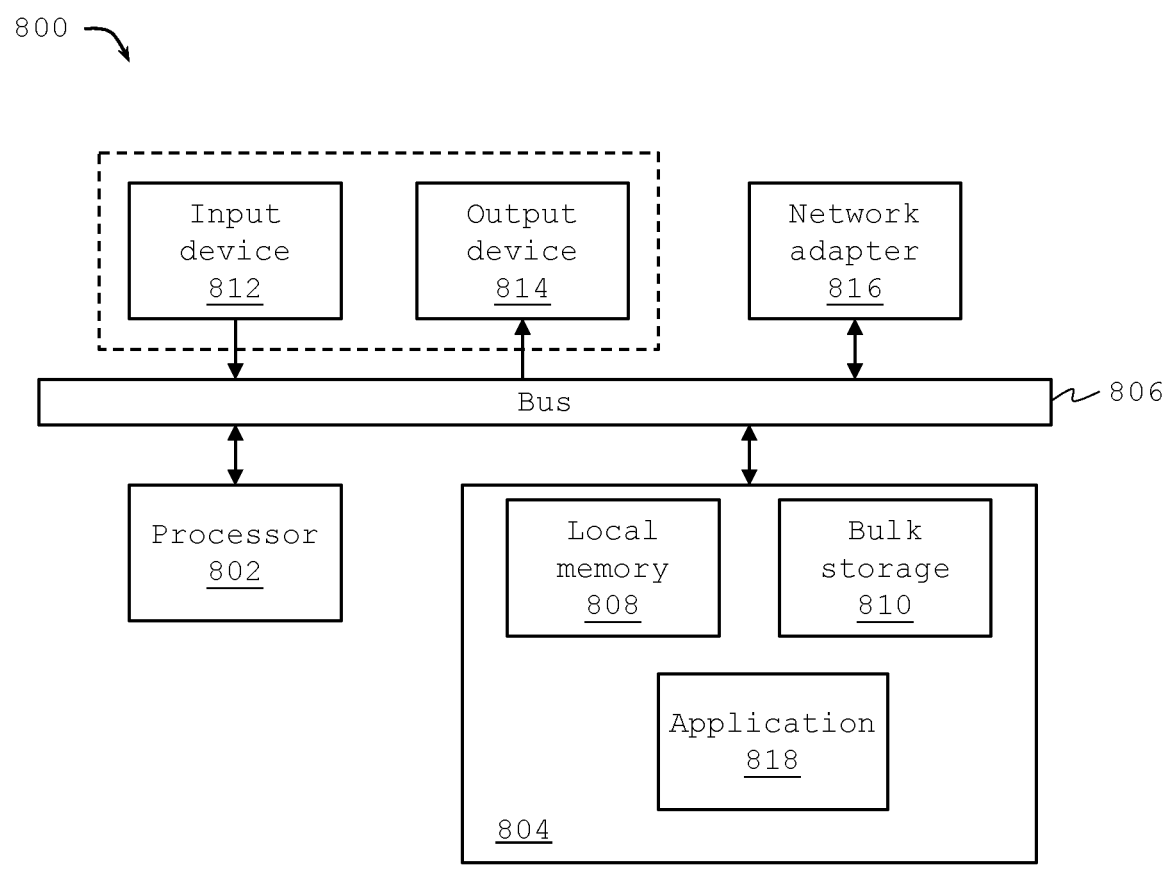
FIG. 16 provides a block diagram illustrating an example data processing system that may be configured to implement, or control, at least portions of operating a transceiver front end, according to some embodiments of the present disclosure.

FIG. 16 provides a block diagram illustrating an example data processing system 800 that may be configured to control operation of parts of a transceiver front end, as described herein, according to some embodiments of the present disclosure. For example, the data processing system 800 may be configured to implement or control portions of operating parts of the transceiver front end 400 as described with reference to FIGS. 6-12.

As shown in FIG. 16, the data processing system 800 may include at least one processor 802, e.g., a hardware processor 802, coupled to memory elements 804 through a system bus 806. As such, the data processing system may store program code within memory elements 804. Further, the processor 802 may execute the program code accessed from the memory elements 804 via a system bus 806. In one aspect, the data processing system may be implemented as a computer that is suitable for storing and/or executing program code. It should be appreciated, however, that the data processing system 800 may be implemented in the form of any system including a processor and a memory that is capable of performing the functions described within this disclosure.

In some embodiments, the processor 802 can execute software or an algorithm to perform the activities as discussed in the present disclosure, in particular activities related to configuring and/or operating one or more I/O based transceiver front ends as described herein. The processor 802 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (IC) (ASIC), or a virtual machine processor. The processor 802 may be communicatively coupled to the memory element 804, for example in a direct-memory access (DMA) configuration, so that the processor 802 may read from or write to the memory elements 804.

In general, the memory elements 804 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 800 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Elements shown in the present figures can also include suitable interfaces for receiving, transmitting, and/or otherwise communicating data or information in a network environment so that they can communicate with, e.g., the data processing system 800.

In certain example implementations, mechanisms operating transceiver front ends as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as the memory elements 804 shown in FIG. 16, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as the processor 802 shown in FIG. 16, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 804 may include one or more physical memory devices such as, for example, local memory 808 and one or more bulk storage devices 810. The local memory may refer to RAM or other non-persistent memory device(s) generally used during actual execution of the program code. A bulk storage device may be implemented as a hard drive or other persistent data storage device. The processing system 800 may also include one or more cache memories (not shown) that provide temporary storage of at least some program code in order to reduce the number of times program code must be retrieved from the bulk storage device 810 during execution.

As shown in FIG. 16, the memory elements 804 may store an application 818. In various embodiments, the application 818 may be stored in the local memory 808, the one or more bulk storage devices 810, or apart from the local memory and the bulk storage devices. It should be appreciated that the data processing system 800 may further execute an operating system (not shown in FIG. 8) that can facilitate execution of the application 818. The application 818, being implemented in the form of executable program code, can be executed by the data processing system 800, e.g., by the processor 802. Responsive to executing the application, the data processing system 800 may be configured to perform one or more operations or method steps described herein.

Input/output (I/O) devices depicted as an input device 812 and an output device 814, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 814 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 814. Input and/or output devices 812, 814 may be coupled to the data processing system either directly or through intervening I/O controllers.

In an embodiment, the input and the output devices may be implemented as a combined input/output device (illustrated in FIG. 16 with a dashed line surrounding the input device 812 and the output device 814). An example of such a combined device is a touch sensitive display, also sometimes referred to as a "touch screen display" or simply "touch screen". In such an embodiment, input to the device may be provided by a movement of a physical object, such as a stylus or a finger of a user, on or near the touch screen display.

A network adapter 816 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 800, and a data transmitter for transmitting data from the data processing system 800 to said systems, devices and/or networks. Modems, cable modems, and Ethernet cards are examples of different types of network adapter that may be used with the data processing system 800.

Select Examples

The following paragraphs provide various examples of the embodiments disclosed herein.

Example 1 provides a method in an in-phase and quadrature phase (I/O) based transceiver front end. The method may include receiving, e.g., in an observation module if the transceiver front end, a transmitter signal. The transmitter signal may be based on a user data signal and a PN sequence. The method may further include receiving, e.g., in the observation module, a receiver signal comprising the user data signal and the PN sequence. The receiver signal may be based on the user data signal and the PN sequence. The receiver signal is typically based on the transmitter signal. For example, the receiver signal may be the transmitter signal after being transmitted and as received at a receiver. The method may further include receiving, e.g., in the observation module, the PN sequence. The method may further include obtaining, e.g., in the observation module, a despreaded transmitter signal using the PN sequence. The method may further include obtaining, e.g., in the observation module, a despreaded receiver signal using the PN sequence.

Example 2 provides a method according to example 1, wherein the method may further include accumulating, e.g., in an accumulator module of the observation module, the transmitter signal and the receiver signal. The method may further include despreading, e.g., in a first despreader of the observation module, the transmitter signal using the PN sequence to obtain the despreaded transmitter signal. The method may further include despreading, e.g., in a second despreader of the observation module, the receiver signal using the PN sequence to obtain the despreaded receiver signal.

Example 3 provides a method according to example 2, wherein the method may further include synchronizing, e.g., in a first FIFO buffer of the observation module, the received transmitter signal before being provided to the accumulator module and the first despreader. The method may further include synchronizing, e.g., in a second FIFO buffer of the observation module, the PN sequence before being provided to the first despreader and the second despreader. The method may further include synchronizing, e.g., in an interpolator module of the observation module, the received receiver signal before being provided to the accumulator module and the second despreader.

Example 4 provides a method according to example 3, wherein performing synchronizations, e.g., by the first FIFO buffer and the second FIFO buffer, using one or more integer delay values, e.g., received from an analysis module of the transceiver front end, and wherein performing, e.g., by the interpolator module, synchronization using one or more fractional delay values, e.g., received from the analysis module.

Example 5 provides a method according to example 1, wherein the method may further include receiving, e.g., in an analysis module of the transceiver front end, the transmitter signal, the despreaded transmitter signal, the receiver signal and the despreaded receiver signal, e.g., from the observation module. The method may further include determining, e.g., in the analysis module, one or more LO leakage parameters of the transceiver front end, based on the transmitter signal, the despreaded transmitter signal, the receiver signal and the despreaded receiver signal. The method may further include determining, e.g., in the analysis module, one or more quadrature error parameters of the transceiver front end, based on the despreaded transmitter signal and the despreaded receiver signal.

Example 6 provides a method according to example 5, wherein the method may further include receiving, e.g., in a channel estimation module of the analysis module, the despreaded transmitter signal and the despreaded receiver signal from the observation module. The channel estimation module may determine channel characteristics of the transmission channel between a transmitter RF front end of the transceiver front end and an observation receiver, based on the despreaded transmitter signal and the despreaded receiver signal.

Example 7 provides a method according to example 6, wherein implementing a transmitter RF front end, a transmission channel and an observation receiver as a software model in the transceiver front end.

Example 8 provides a method according to example 6, wherein the method may further include receiving, e.g., in a user data cancelation module of the analysis module, the transmitter signal and the receiver signal, e.g., from the observation module. The method may further include canceling interference, e.g., in the user data cancelation module, based on the transmitter signal, the receiver signal and the channel characteristics, e.g., as determined by the channel estimation module. The method may further include determining, e.g., in a LO leakage estimation module of the analysis module, the one or more LO leakage parameters, based on the channel characteristics, e.g., as determined by the channel estimation module, and a result of the canceling of the interference.

Example 9 provides a method according to example 6, wherein the method may further include determining, e.g., in a quadrature error calculation module of the analysis module, the one or more quadrature error parameters, based on the channel characteristics, e.g., as determined by the channel estimation module.

Example 10 provides a method according to example 6, wherein the method may further include generating, e.g., in a PN scaling generator module, a scaling factor. The PN sequence in the transmitter signal and in the receiver signal may have been multiplied by the scaling factor. The determining of the channel characteristics may further be based on the scaling factor, e.g., as received from the scaling generator module.

Example 11 provides a method according to example 1, wherein the method may further include generating, e.g., in a PN generator of a PN sequence injection and signal generation module, the PN sequence. The method may further include modulating, e.g., in a BPSK modulator of the PN sequence injection and signal generation module, the PN sequence according to a BPSK standard and obtaining a modulated PN sequence. The method may further include scaling, e.g., in an in-phase and quadrature scaling module of the PN sequence injection and signal generation module, the modulated PN sequence to obtain a scaled PN sequence. The method may further include adding, e.g., in one or more adder modules of the PN sequence injection and signal generation module, the scaled PN sequence to the user data signal to obtain the transmitter signal.

Example 12 provides a RFIC. The RFIC may be a part of an in-phase and quadrature phase (I/O) based transceiver front end. The RFIC may include a software controlled digital circuit including a PN generator for generating a PN sequence and one or more adder modules for adding the PN sequence or a derivative of the PN sequence to an in-phase and quadrature phase (I/O) based user data signal. The RFIC may further include a further digital circuit including an accumulator module to receive a transmitter signal and a receiver signal, the further digital circuit further including one or more despreader module to despread the transmitter signal and the receiver signal using the PN sequence to obtain a despreaded transmitter signal and a despreaded receiver signal.

Example 13 provides a RFIC according to example 12, wherein the RFIC may further include firmware comprising software code which, when executed by one or more processors, generates and outputs channel characteristics of a transmission channel between a transmitter RF front end and an observation receiver, using the despreaded transmitter signal and the despreaded receiver signal as inputs.

Example 14 provides a RFIC according to example 13, wherein the transmitter RF front end, the transmission channel and the observation receiver may be implemented as system properties simulating the transmitter RF front end, the transmission channel and the observation receiver.

Example 15 provides a RFIC according to example 13, wherein the firmware may further include software code which, when executed by the one or more processors, generates and outputs one or more LO leakage parameters, using the channel characteristics and a user data cancelation result as inputs, wherein the user data cancelation result is obtained by software code which, when executed by the one or more processors, generates and outputs the data cancelation result using the transmitter signal, the receiver signal and the channel characteristics as inputs.

Example 16 provides a RFIC according to example 13, wherein the firmware may further include software code which, when executed by the one or more processors, generates and outputs one or more quadrature error parameters, using the channel characteristics as input.

Example 17 provides a method for generating LO leakage parameters and quadrature error parameters. The method may include generating a PN sequence. The method may further include inserting the PN sequence or a derivative of the PN sequence into a user data signal to obtain a transmitter signal. The method may further include receiving the transmitter signal. The method may further include obtaining a despreaded transmitter signal from the transmitter signal using a same PN sequence. The method may further include receiving an observation receiver signal, the observation receiver signal being based on the transceiver signal. The method may further include obtaining a despreaded receiver signal from the receiver signal using the same PN sequence. The method may further include determining the LO leakage parameters and the quadrature error parameters based on the transmitter signal, the despreaded transmitter signal, the observation receiver signal and the despreaded received signal.

Example 18 provides a method according to example 17, wherein the determining of the quadrature error parameters may include: estimating channel characteristics based on the despreaded receiver signal and the despreaded transmitter signal; and extracting quadrature error parameters using the estimated channel characteristics.

Example 19 provides a method according to example 17, wherein the determining of the LO leakage parameters may include estimating channel characteristics based on the despreaded receiver signal and the despreaded transmitter signal. The determining of the LO leakage parameters may further include eliminating user data interference based on the received observation receiver signal and received transmitter signal, and using the estimated channel characteristics. The determining of the LO leakage parameters may further include computing the LO leakage parameters based on the eliminated user data interference and the estimated channel characteristics.

Example 20 provides a method according to example 17, wherein the method may further include generating the receiver signal using a model of a transmitter RF front end, a transmission channel and an observation receiver.

Example 21 provides an in-phase and quadrature phase (I/O) based transceiver front end. The transceiver front end may include an observation module. The observation module may be to receive a transmitter signal comprising a user data signal and a PN sequence. The observation module may further be to receive a receiver signal comprising the user data signal and the PN sequence. The observation module may further be to receive the PN sequence. The observation module may further be to obtain a despreaded transmitter signal using the PN sequence. The observation module may further be to obtain a despreaded receiver signal using the PN sequence.

Example 22 provides a transceiver front end according to example 21, wherein the observation module may include an accumulator module to receive and accumulate the transmitter signal and the receiver signal. The observation module may further include a first despreader to despread the transmitter signal using the PN sequence to obtain the despreaded transmitter signal. The observation module may further include a second despreader to despread the receiver signal using the PN sequence to obtain the despreaded receiver signal.

Example 23 provides a transceiver front end according to example 22, wherein the observation module may further include a first FIFO buffer to synchronize the received transmitter signal before being provided to the accumulator module and the first despreader. The observation module may further include a second FIFO buffer to synchronize the PN sequence before being provided to the first despreader and the second despreader. The observation module may further include an interpolator module to synchronize the received receiver signal before being provided to the accumulator module and the second despreader.

Example 24 provides a transceiver front end according to example 23, wherein the first FIFO buffer and the second FIFO buffer may be to perform synchronizations using one or more integer delay values received from an analysis module of the transceiver front end. The interpolator module may be to perform synchronization using one or more fractional delay values received from the analysis module.

Example 25 provides a transceiver front end according to example 21, wherein the transceiver front end may further include an analysis module. The analysis module may be to receive the transmitter signal, the despreaded transmitter signal, the receiver signal and the despreaded receiver signal from the observation module. The analysis module may further be to determine one or more LO leakage parameters of the transceiver front end, based on the transmitter signal, the despreaded transmitter signal, the receiver signal and the despreaded receiver signal. The analysis module may further be to determine one or more quadrature error parameters of the transceiver front end, based on the despreaded transmitter signal and the despreaded receiver signal.

Example 26 provides a transceiver front end according to example 25, wherein the analysis module may include a channel estimation module to receive the despreaded transmitter signal and the despreaded receiver signal from the observation module. The channel estimation module may be to determine channel characteristics of the transmission channel between a transmitter RF front end of the transceiver front end and an observation receiver, based on the despreaded transmitter signal and the despreaded receiver signal.

Example 27 provides a transceiver front end according to example 26, wherein the transmitter RF front end, the transmission channel and the observation receiver may be implemented as a software model in the transceiver front end.

Example 28 provides a transceiver front end according to example 26, wherein the analysis module may further include a user data cancelation module to receive the transmitter signal and the receiver signal from the observation module. The user data cancelation module may be to cancel interference, based on the transmitter signal, the receiver signal and the channel characteristics determined by the channel estimation module. The analysis module may further include a LO leakage estimation module to determine the one or more LO leakage parameters, based on the channel characteristics determined by the channel estimation module and an output from the user data cancelation module.

Example 29 provides a transceiver front end according to example 26, wherein the analysis module may further include a quadrature error calculation module to determine the one or more quadrature error parameters, based on the channel characteristics determined by the channel estimation module.

Example 30 provides a transceiver front end according to example 26, wherein the transceiver front end may further include a PN scaling generator module to generate a scaling factor. The PN sequence in the transmitter signal and in the receiver signal may have been multiplied by the scaling factor. The channel estimation module may be to determine the channel characteristics further based on the scaling factor received from the scaling generator module.

Example 31 provides a transceiver front end according to example 31, wherein the transceiver front end may further include a PN sequence injection and signal generation module. The PN sequence injection and signal generation module may include a PN generator to generate the PN sequence. The PN sequence injection and signal generation module may further include a BPSK modulator to modulate the PN sequence according to a BPSK standard and obtain a modulated PN sequence. The PN sequence injection and signal generation module may further include an in-phase and quadrature scaling modules to scale the modulated PN sequence to obtain a scaled PN sequence. The PN sequence injection and signal generation module may further include one or more adder modules to add the scaled PN sequence to the user data signal to obtain the transmitter signal.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It is also imperative to note that all of the specifications, dimensions, and relationships outlined herein (e.g., the number of modules/systems, logic operations, etc.) have only been offered for purposes of example and teaching only. Such information may be varied considerably without departing from the spirit of the present disclosure, or the scope of the appended claims. The specifications apply only to some non-limiting examples and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four or more components. However, this has been done for purposes of clarity and example only. It should be appreciated that the system can be consolidated in any suitable manner. Along similar design alternatives, any of the illustrated components, modules, and elements of the drawings may be combined in various possible configurations, all of which are clearly within the broad scope of the present disclosure.

Note that in the present description, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method to be implemented by an in-phase and quadrature phase (I/Q) based transceiver front end, the method comprising:
   receiving a transmitter signal, wherein the transmitter signal is based on a user data signal and a pseudo-noise sequence;
   receiving a receiver signal, wherein the receiver signal is based on the user data signal and the pseudo-noise sequence;
   obtaining a despreaded transmitter signal using the pseudo-noise sequence;
   obtaining a despreaded receiver signal using the pseudo-noise sequence;
   accumulating one or more transmitter signals and one or more receiver signals to obtain an accumulated transmitter signal and an accumulated receiver signal;
   despreading the accumulated transmitter signal using the pseudo-noise sequence to obtain the despreaded transmitter signal; and
   despreading the accumulated receiver signal using the pseudo-noise sequence to obtain the despreaded receiver signal.

2. The method according to claim 1, further comprising:
   synchronizing the transmitter signal before accumulating and despreading the transmitter signal;

synchronizing the pseudo-noise sequence before despreading the transmitter signal and the receiver signal; and synchronizing the receiver signal before accumulating and despreading the receiver signal.

3. The method according to claim 2,
wherein the transmitter signal is synchronized using one or more integer delay values, and
wherein the receiver signal is synchronized using one or more fractional delay values.

4. The method according to claim 1, further comprising:
determining one or more local oscillator leakage parameters of the I/Q based transceiver front end based on the transmitter signal, the despreaded transmitter signal, the receiver signal and the despreaded receiver signal; and
determining one or more quadrature error parameters of the I/Q based transceiver front end based on the despreaded transmitter signal and the despreaded receiver signal.

5. The method according to claim 4, further comprising:
determining channel characteristics of a transmission channel between a transmitter radio frequency front end of the I/Q based transceiver front end and an observation receiver based on the despreaded transmitter signal and the despreaded receiver signal.

6. The method according to claim 5, further comprising implementing the transmitter radio frequency front end, the transmission channel and the observation receiver as software models in the I/Q based transceiver front end.

7. The method according to claim 5, further comprising:
canceling interference based on the transmitter signal, the receiver signal and the channel characteristics; and
determining the one or more local oscillator leakage parameters based on the channel characteristics and a result of the canceling of the interference.

8. The method according to claim 5, further comprising:
determining the one or more quadrature error parameters based on the channel characteristics.

9. The method according to claim 5, further comprising:
generating a scaling factor; and
generating a scaled pseudo-noise sequence using the scaling factor,
wherein the transmitter signal and the receiver signal are based on the scaled pseudo-noise sequence,
and wherein the channel characteristics are determined further based on the scaling factor.

10. The method according to claim 1, further comprising:
generating the pseudo-noise sequence;
modulating the pseudo-noise sequence according to a binary phase-shift keying standard to obtain a modulated pseudo-noise sequence;
scaling the modulated pseudo-noise sequence to obtain a scaled pseudo-noise sequence; and
adding the scaled pseudo-noise sequence to the user data signal to obtain the transmitter signal.

11. A radio frequency integrated circuit, comprising:
a software controlled digital circuit including a pseudo-noise generator for generating a pseudo-noise sequence and one or more adder circuits for adding the pseudo-noise sequence or a derivative of the pseudo-noise sequence to an in-phase and quadrature phase (I/Q) based user data signal; and
a further digital circuit including an accumulator circuit to receive a transmitter signal and a receiver signal, wherein the transmitter signal is based on the I/Q based user data signal and wherein the receiver signal is based on the I/Q based user data signal,
wherein the further digital circuit further includes one or more despreader circuits to despread the transmitter signal and the receiver signal using the pseudo-noise sequence to obtain a despreaded transmitter signal and a despreaded receiver signal; and
at least one memory circuit comprising first software code which, when executed by one or more processors, generates channel characteristics of a transmission channel between a transmitter radio frequency front end and an observation receiver using the despreaded transmitter signal and the despreaded receiver signal as inputs.

12. The radio frequency integrated circuit according to claim 11, wherein the transmitter radio frequency front end, the transmission channel and the observation receiver are implemented as system properties simulating the transmitter radio frequency front end, the transmission channel and the observation receiver.

13. The radio frequency integrated circuit according to claim 11,
wherein the at least one memory circuit comprises second software code which, when executed by the one or more processors, generates a user data cancelation result using the transmitter signal, the receiver signal and the channel characteristics as inputs,
and wherein the at least one memory circuit comprises third software code which, when executed by the one or more processors, generates one or more local oscillator leakage parameters using the channel characteristics and the user data cancelation result as inputs.

14. The radio frequency integrated circuit according to claim 11, wherein the at least one memory circuit further comprises fourth software code which, when executed by the one or more processors, generates one or more quadrature error parameters using the channel characteristics as input.

15. A method for generating local oscillator leakage parameters and quadrature error parameters, the method comprising:
generating a pseudo-noise sequence;
inserting the pseudo-noise sequence or a derivative of the pseudo-noise sequence into a user data signal to obtain a transmitter signal;
obtaining a despreaded transmitter signal from the transmitter signal using the pseudo-noise sequence;
receiving an observation receiver signal, the observation receiver signal being based on the transmitter signal;
obtaining a despreaded receiver signal from the observation receiver signal using the pseudo-noise sequence; and
determining the local oscillator leakage parameters and the quadrature error parameters based on the transmitter signal, the despreaded transmitter signal, the observation receiver signal and the despreaded received signal.

16. The method according to claim 15, wherein the determining of the quadrature error parameters comprises:
estimating channel characteristics based on the despreaded receiver signal and the despreaded transmitter signal; and
extracting the quadrature error parameters using the estimated channel characteristics.

17. The method according to claim 15, wherein the determining of the local oscillator leakage parameters comprises:

estimating channel characteristics based on the despreaded receiver signal and the despreaded transmitter signal;

eliminating user data interference based on the observation receiver signal, the transmitter signal and the channel characteristics; and computing the local oscillator leakage parameters based on an outcome of the eliminating of the user data interference and the channel characteristics.

18. The method according to claim 15, further comprising:

generating the receiver signal using models of one or more of a transmitter radio frequency front end, a transmission channel, and an observation receiver.

* * * * *